(12) United States Patent
Huang et al.

(10) Patent No.: US 9,170,454 B2
(45) Date of Patent: Oct. 27, 2015

(54) DISPLAYS

(71) Applicants: INNOCOM TECHNOLOGY(SHENZHEN) CO., LTD., Longhua Town, Bao An District, Shenzhen, Guangdong Province (TW); Chimei InnoLux Corporation, Miao-Li County (TW)

(72) Inventors: Yi-Pai Huang, Miao-Li County (TW); Ching-Yi Hsu, Miao-Li County (TW); Che-Hsuan Yang, Miao-Li County (TW); Chia-Liang Hung, Miao-Li County (TW)

(73) Assignees: INNOCOM TECHNOLOGY(SHENZHEN) CO., LTD., Longhua Town, Shenzhen (CN); INNOLUZ CORPORATION, Miao-Li County (TW)

( * ) Notice: Subject to any disclaimer, the term of this patent is extended or adjusted under 35 U.S.C. 154(b) by 387 days.

(21) Appl. No.: 13/686,545

(22) Filed: Nov. 27, 2012

(65) Prior Publication Data
US 2013/0215364 A1    Aug. 22, 2013

(30) Foreign Application Priority Data

Feb. 22, 2012    (TW) ............................ 101105747 A
Mar. 30, 2012    (TW) ............................ 101111267 A

(51) Int. Cl.
*G02F 1/1335* (2006.01)
*G02B 27/22* (2006.01)
*G02B 27/00* (2006.01)

(52) U.S. Cl.
CPC ...... *G02F 1/133603* (2013.01); *G02B 27/0093* (2013.01); *G02B 27/2214* (2013.01); *G02B 27/2264* (2013.01)

(58) Field of Classification Search
CPC ............... G02F 1/133603; G02B 27/2214; G02B 27/2264; G02B 27/0093
USPC ......................................... 349/15, 69, 95, 200
See application file for complete search history.

(56) References Cited

U.S. PATENT DOCUMENTS

| 7,068,252 | B2 | 6/2006 | Hattori et al. | |
| 7,821,711 | B2 | 10/2010 | Kim et al. | |
| 2006/0114371 | A1* | 6/2006 | Peterson et al. | 349/61 |
| 2007/0096125 | A1* | 5/2007 | Vogel et al. | 257/89 |

FOREIGN PATENT DOCUMENTS

| CN | 1573435 | 2/2005 |
| CN | 101071535 | 11/2007 |
| CN | 101242545 | 8/2008 |

OTHER PUBLICATIONS

Chinese language office action dated Nov. 15, 2014.
English language translation of abstract of CN 1573435 (published Feb. 2, 2005).
English language translation of abstract of CN 101071535 (published Nov. 14, 2007).
English language translation of abstract of CN 101242545 (published Aug. 13, 2008).

* cited by examiner

*Primary Examiner* — Bumsuk Won
*Assistant Examiner* — Charles Chang
(74) *Attorney, Agent, or Firm* — McClure, Qualey & Rodack, LLP

(57) ABSTRACT

In one embodiment of the invention, a display is provided. The display includes a light-emitting system including a plurality of light-emitting units, wherein each light-emitting unit emits light independently, a lens array including a plurality of lenses disposed on the light-emitting system, and a first liquid crystal display cell including a plurality of pixels disposed on the lens array, wherein the number of the light-emitting units of the light-emitting system is larger than that of the pixels of the first liquid crystal display cell.

20 Claims, 24 Drawing Sheets

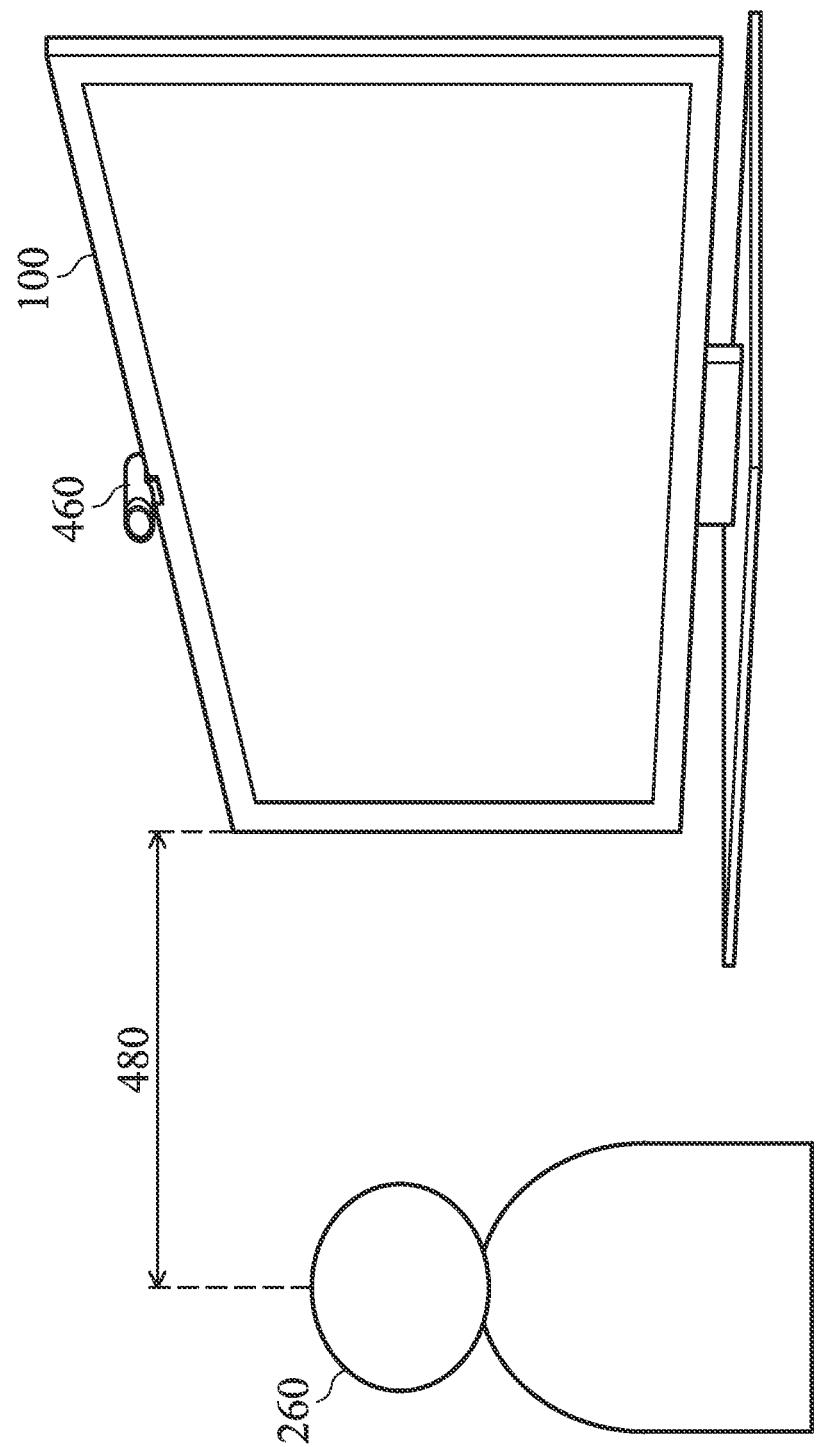

DISPLAYS

CROSS REFERENCE TO RELATED APPLICATIONS

This application claims priority of Taiwan Patent Application No. 101111267, filed on Mar. 30, 2012, and Taiwan Patent Application No. 101105747, filed on Feb. 22, 2012, the entireties of which are incorporated by reference herein.

BACKGROUND OF THE INVENTION

1. Field of the Invention

The invention relates to a display, and in particular to a multi-view and multi-user display.

2. Description of the Related Art

With development of era and technological progress, human beings spare no effort to peruse more real image all the time; display of stereoscopic image. By parallax of human beings' two eyes, a stereoscopic display provides different images to the left and right eyes of a viewer through various technologies. Such images are then composed to produce a stereoscopic image by the brain.

Current stereoscopic image displaying technologies are spatial form technologies, in general, in addition to wearing glasses. However, the screen resolution of this form will be decreased. Additionally, conventional stereoscopic image display can only be viewed by a single viewer and it is difficult for more than one viewer to simultaneously view the display due to the limitation of the light-emitting direction of conventional backlight system.

BRIEF SUMMARY OF THE INVENTION

In one embodiment of the invention, a display is provided. The display comprises a light-emitting system comprising a plurality of light-emitting units, wherein each light-emitting unit emits light independently; a lens array comprising a plurality of lenses disposed on the light-emitting system; and a first liquid crystal display cell comprising a plurality of pixels disposed on the lens array, wherein the number of the light-emitting units of the light-emitting system is larger than that of the pixels of the first liquid crystal display cell.

In one embodiment, the light-emitting system comprises a plurality of organic light-emitting diode groups. Each organic light-emitting diode group comprises a plurality of organic light-emitting diode units. Each organic light-emitting diode unit corresponds to a position in the organic light-emitting diode group. The position in the organic light-emitting diode group corresponding to each organic light-emitting diode unit holds a light-emitting unit.

At a first time, at least one organic light-emitting diode unit of each organic light-emitting diode group provides a first light source passing through a first image such that one eye of a viewer receives the first image. At a second time, at least one organic light-emitting diode unit of each organic light-emitting diode group provides a second light source passing through a second image such that the other eye of the viewer receives the second image. The first time is earlier than the second time. The organic light-emitting diode units providing the first light source and the organic light-emitting diode units providing the second light source correspond to various positions in the organic light-emitting diode groups.

In one embodiment, the light-emitting system is a second liquid crystal display cell comprising a backlight and a pixel district disposed on the backlight. The pixel district comprises a plurality of pixel groups. Each pixel group comprises a plurality of pixels. Each pixel corresponds to a position in the pixel group. The position in the pixel group corresponding to each pixel holds a light-emitting unit.

At a first time, at least one pixel of each pixel group provides a first light source passing through a first image such that one eye of a viewer receives the first image. At a second time, at least one pixel of each pixel group provides a second light source passing through a second image such that the other eye of the viewer receives the second image. The first time is earlier than the second time. The pixels providing the first light source and the pixels providing the second light source correspond to various positions in the pixel groups.

In one embodiment, the invention further comprises a charge coupled device (CCD) coupled to the display to detect the number of viewers and distance between the viewers and the display.

The invention adopts organic light-emitting diodes (OLEDs) or a liquid crystal display (LCD) cell with a backlight as a sectional light-emitting system of a display and a tracking technology (e.g. coupling a charge coupled device (CCD)) to control which light-emitting unit in the light-emitting system should be turned on or turned off to provide various stereoscopic images (multi-views) to a viewer at various locations and efficiently lower "cross talk" phenomenon. Furthermore, the light-emitting system of the display of the invention can also turn on numerous light-emitting units simultaneously to provide the same stereoscopic image to more than one viewer (multi-users) to view at the same time while other unnecessary light-emitting units can be directly turned off to achieve the effect of energy saving.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein:

FIG. 12 shows a charge coupled device (CCD) coupled to a display according to an embodiment of the invention;

DETAILED DESCRIPTION OF THE INVENTION

Figure 1:
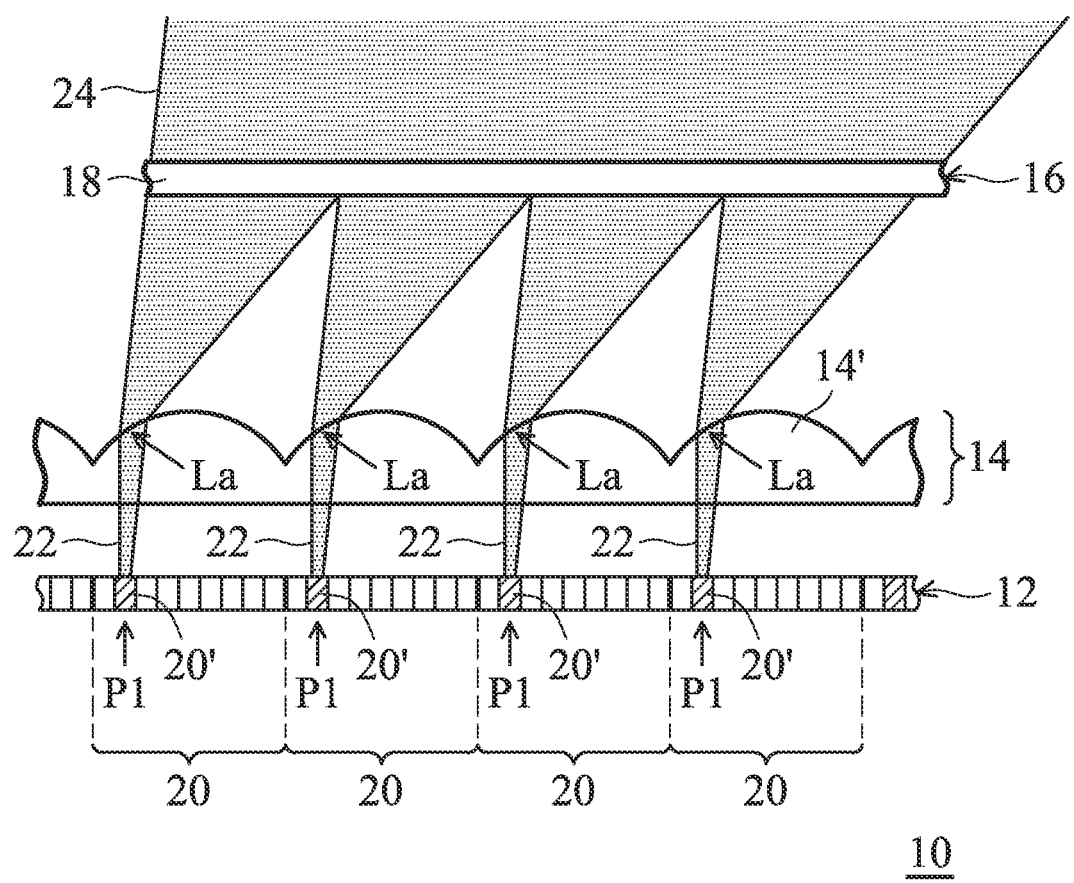
FIG. 1 shows a display according to an embodiment of the invention.
Figure 2:
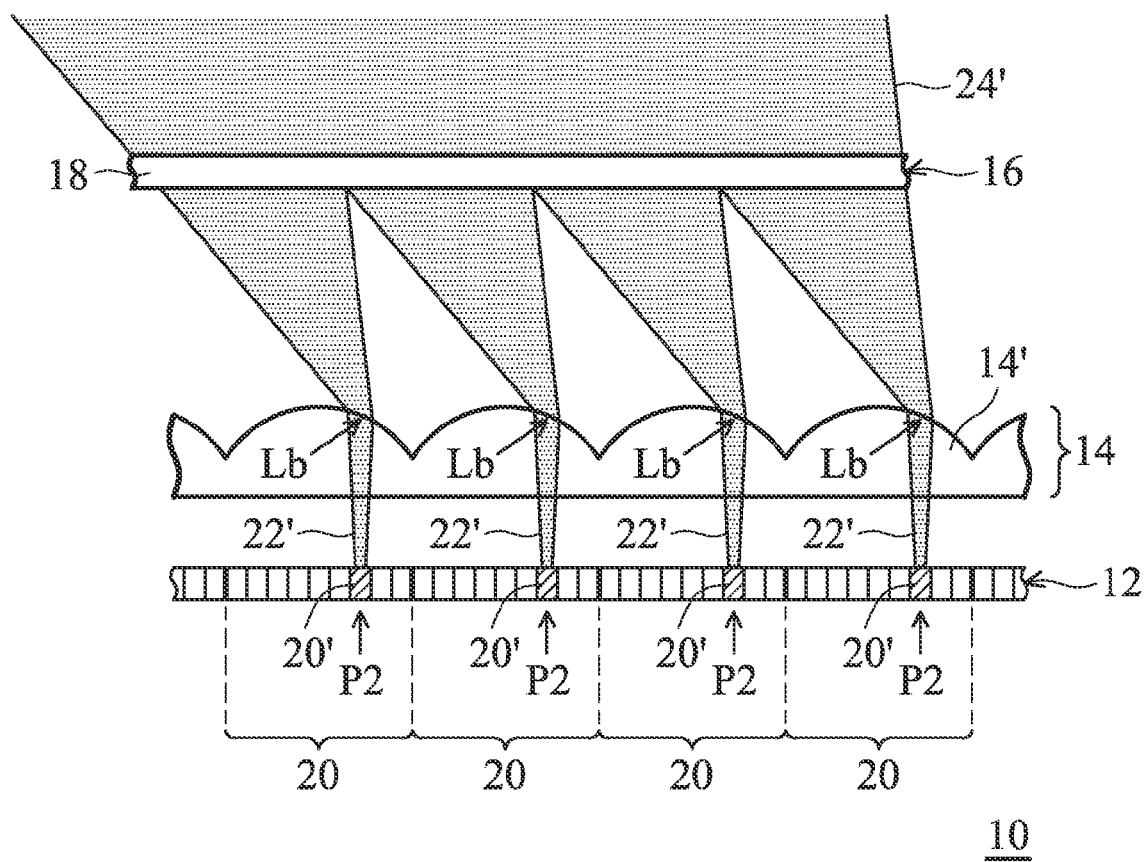
FIG. 2 shows a display according to an embodiment of the invention.

Referring to FIGS. 1-2, in accordance with one embodiment of the invention, a display is illustrated. A display 10 comprises a light-emitting system 12, a lens array 14 and a first liquid crystal display cell 16. The light-emitting system 12 comprises a plurality of light-emitting units 20'. Each light-emitting unit 20' emits light independently. The lens array 14 comprises a plurality of lenses 14' disposed on the light-emitting system 12. The first liquid crystal display cell 16 comprises a plurality of pixels 18 disposed on the lens array 14.

When the display 10 displays a left-eye picture and a right-eye picture by turns in temporal, a stereoscopic image may be seen by a human. However, when the display 10 displays pictures without distinguishing a left-eye picture from a right-eye picture in temporal, a non-stereoscopic image may be seen by a human. Therefore, the display 10 may display stereoscopic images. In another embodiment, the display 10 may also be switched to display non-stereoscopic images.

In one embodiment, the light-emitting system 12 may comprise a plurality of organic light-emitting diode (OLED) groups 20. Each organic light-emitting diode group 20 comprises a plurality of organic light-emitting diode units (pixels) 20'. Each organic light-emitting diode unit (pixel) 20' corresponds to a position (holding a light-emitting unit) in the organic light-emitting diode group 20. In the light-emitting system 12, the total number of the organic light-emitting diode units (pixels) 20' is equal to the number of the light-emitting units 20'. The total number of the organic light-emitting diode units (pixels) 20' of the light-emitting system 12 is larger than the number of the pixels 18 of the first liquid crystal display cell 16. Preferably, the total number of the organic light-emitting diode units (pixels) 20' of the light-emitting system 12 is at least three times that of the number of the pixels 18 of the first liquid crystal display cell 16.

The organic light-emitting diode units 20' may be passive matrix or active-matrix organic light-emitting diodes.

In this embodiment, at a first time, in the light-emitting system 12, at least one organic light-emitting diode unit 20' of each organic light-emitting diode group 20 provides a first light source 22. The first light source 22 corresponds to a position in the lens array 14. The light shape of the first light source 22 is adjusted by the lens array 14 to have the light shape uniformly distributed, wherein the first light source 22 passes through the first liquid crystal display cell 16 and fills up the display area of the first liquid crystal display cell 16. The first light source 22 passes through a first image 24 provided by the first liquid crystal display cell 16 such that a viewer's left eye receives the first image 24, as shown in FIG. 1. At a second time, in the light-emitting system 12, at least one organic light-emitting diode unit 20' of each organic light-emitting diode group 20 provides a second light source 22'. The second light source 22' corresponds to another position in the lens array 14. The light shape of the second light source 22' is adjusted by the lens array 14 to have the light shape uniformly distributed, wherein the second light source 22' passes through the first liquid crystal display cell 16 and fills up the display area of the first liquid crystal display cell 16. The second light source 22' passes through a second image 24' provided by the first liquid crystal display cell 16 such that the viewer's right eye receives the second image 24', as shown in FIG. 2. At this time, the first image 24 received by the viewer's left eye and the second image 24' received by the viewer's right eye are fused to form a 3D stereoscopic image in the brain, and the number of the pixels seen by the left eye and right eye of the viewer is equal to the number of the pixels of the first liquid crystal display cell 16. That is, the resolution of the stereoscopic image fused by the viewer is not reduced. In other embodiments, the output sequence of the left-eye image and right-eye image may be altered. The light-emitting system 12 appoints different organic light-emitting diode units 20' to emit light such that the light source (22 or 22') corresponds to various positions in the lens array 14 to change the light shape of the emitted light. The first time may be earlier or later than the second time. The organic light-emitting diode units 20' providing the first light source 22 and the organic light-emitting diode units 20' providing the second light source 22' correspond to various positions (light-emitting units) in the organic light-emitting diode groups 20. For example, the organic light-emitting diode units 20' providing the first light source 22 correspond to "position 1" (P1) in the organic light-emitting diode groups 20 and the first light source 22 provided thereby corresponds to "position a" (La) in the lens array 14, as shown in FIG. 1. Additionally, the organic light-emitting diode units 20' providing the second light source 22' correspond to "position 2" (P2) in the organic light-emitting diode groups 20 and the second light source 22' provided thereby corresponds to "position b" (Lb) in the lens array 14, as shown in FIG. 2. "Position 1" (P1) may be adjacent or nonadjacent to "position 2" (P2). No overlapping between "position 1" (P1) and "position 2" (P2) is required. "Position a" (La) may partially or may not overlap with "position b" (Lb).

Figure 3:
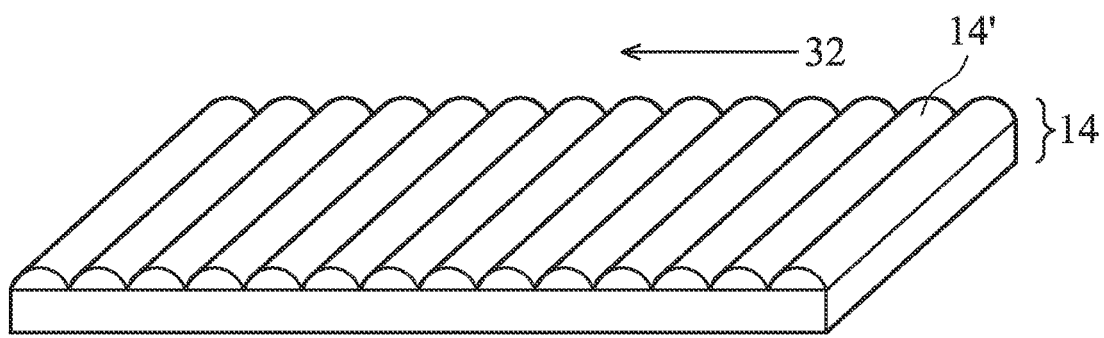
FIG. 3 shows a lens and lens array patterns according to an embodiment of the invention.
Figure 4A:
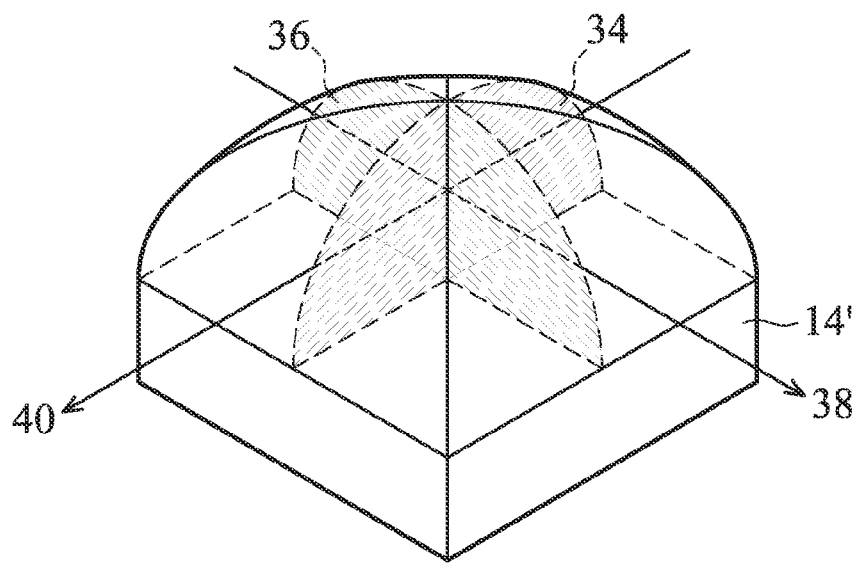
FIG. 4A shows a lens pattern according to an embodiment of the invention.
Figure 4B:
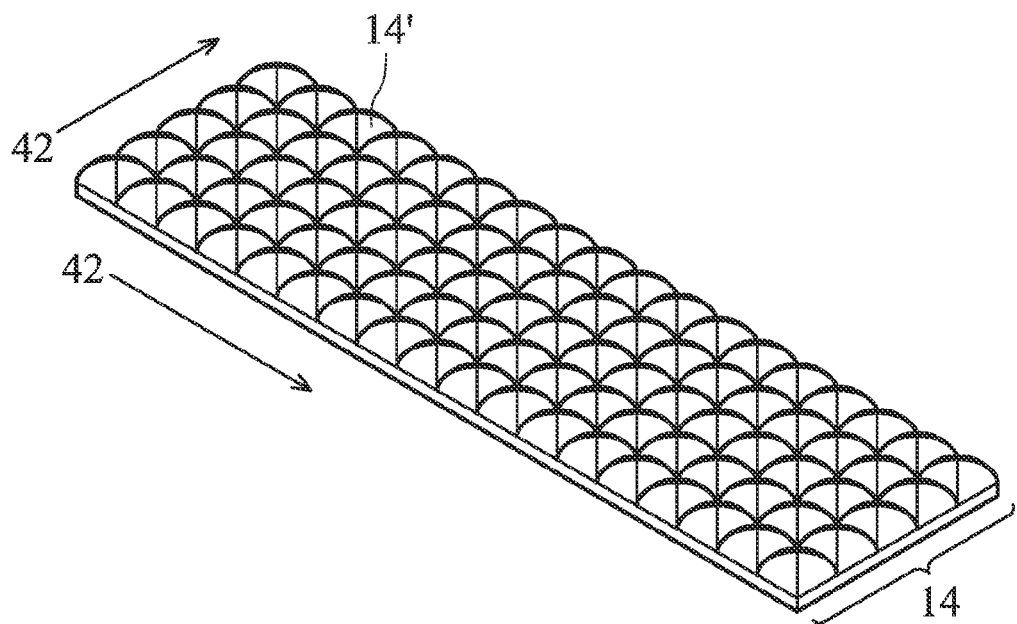
FIG. 4B shows a lens array pattern according to an embodiment of the invention.

In one embodiment, the lens 14' may be columnar and arranged in a strip form 32 to form the lens array 14, as shown in FIG. 3. In another embodiment, referring to FIG. 4A, the lens 14' may also have a first semi-circular cross-section 34 and a second semi-circular cross-section 36. The normal direction 38 of the first semi-circular cross-section 34 is perpendicular to the normal direction 40 of the second semi-circular cross-section 36. In this embodiment, the lens 14' is arranged in an array 42 to form the lens array 14, as shown in FIG. 4B. In other embodiments, the lens 14' may also be arranged in other forms to form the lens array 14 and may have various cross-section shapes (or curvature). Specifically, the arrangement form of forming the lens array 14 and the cross-section shapes (or curvature) of the lens 14' are adjusted based on the relative position and distance between the light-emitting system 12 and the lens 14' and the same between the light-emitting system 12 and the first liquid crystal display cell 16 to have the light source (22 or 22') emit light towards a given direction and have the light shape uniformly distributed, wherein the light passes through the first liquid crystal display cell 16 and fills up the display area of the first liquid crystal display cell 16, as shown in FIG. 1 or FIG. 2. In addition, the first liquid crystal display cell 16 can control whether light passes or does not pass therethrough, to adjust the gray scale and color.

Additionally, various substances, for example air or glass, may be filled between the lens 14' and the first liquid crystal display cell 16. The spacing between the lens 14' and the first liquid crystal display cell 16 is adjusted based on the various filled substances. In one embodiment, if air (refractive index=1) is filled between the lens 14' and the first liquid crystal display cell 16, the spacing between the lens 14' and the first liquid crystal display cell 16 may be set to, for example, 3 mm. In another embodiment, if glass (refractive index=1.5) is filled between the lens 14' and the first liquid crystal display cell 16, the spacing between the lens 14' and the first liquid crystal display cell 16 may be increased to, for example, 4.5 mm.

Figure 5:
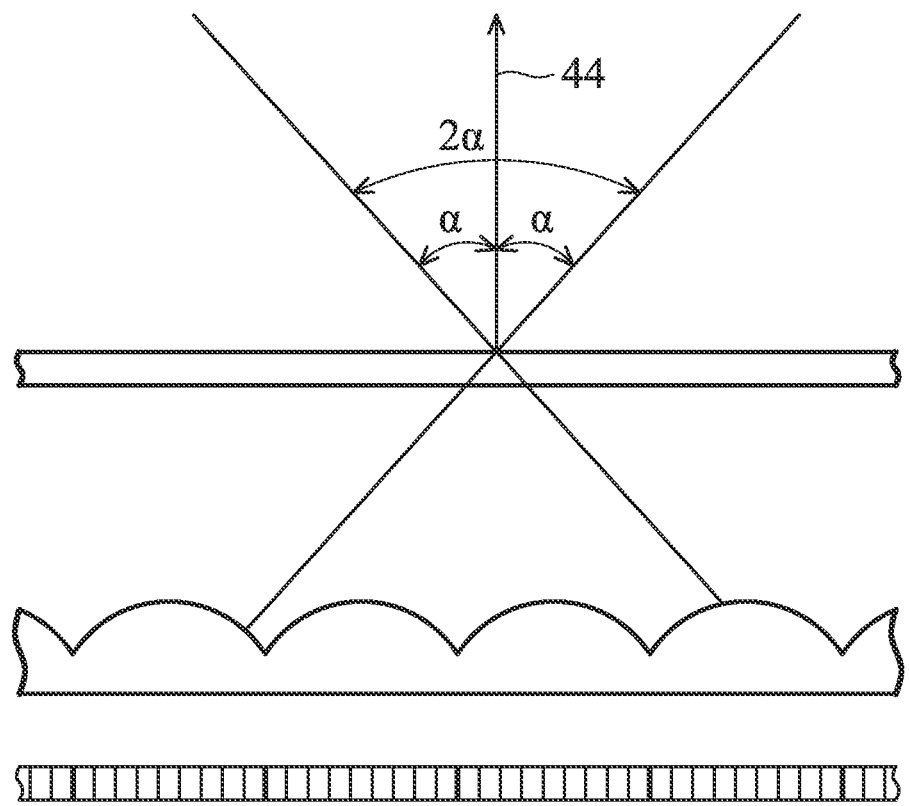
FIG. 5 shows the best viewing area when a viewer is viewing a display according to an embodiment of the invention.

In one embodiment, an included angle α between the location of the viewer and the normal 44 of the display 10 is about 0-20° ($0 \leq \alpha \leq 20$). This angle range represents the best viewing area ($2\alpha$) when the viewer is viewing the display 10, as shown in FIG. 5.

Still referring to FIG. 1 or FIG. 2, in one embodiment, the first liquid crystal display cell 16 may adopt the manner of outputting left-eye and right-eye images by turns and be driven at 120 Hz speeds. In another embodiment, the first liquid crystal display cell 16 may adopt the light-emitting system 12 and display images by adopting the color sequential method. In another embodiment, the first liquid crystal display cell 16 may display images by adopting the color sequential method of three primary colors of red (R), green (G) and blue (B). In another embodiment, the first liquid crystal display cell 16 may adopt colors provided by a light source and further display images by adopting the color sequential method. In another embodiment, the first liquid crystal display cell 16 may also adopt the color sequential method to calculate that at least three time-series pictures are displayed within a frame time creating a more high-speed driving manner.

Additionally, the first liquid crystal display cell 16 may adopt the liquid crystal types with a high-speed response time, for example an optically compensated bend (OCB) liquid crystal, blue-phase liquid crystal or ferroelectric liquid crystal (FLC), to achieve the requirement for fast liquid crystal response.

Figure 6:
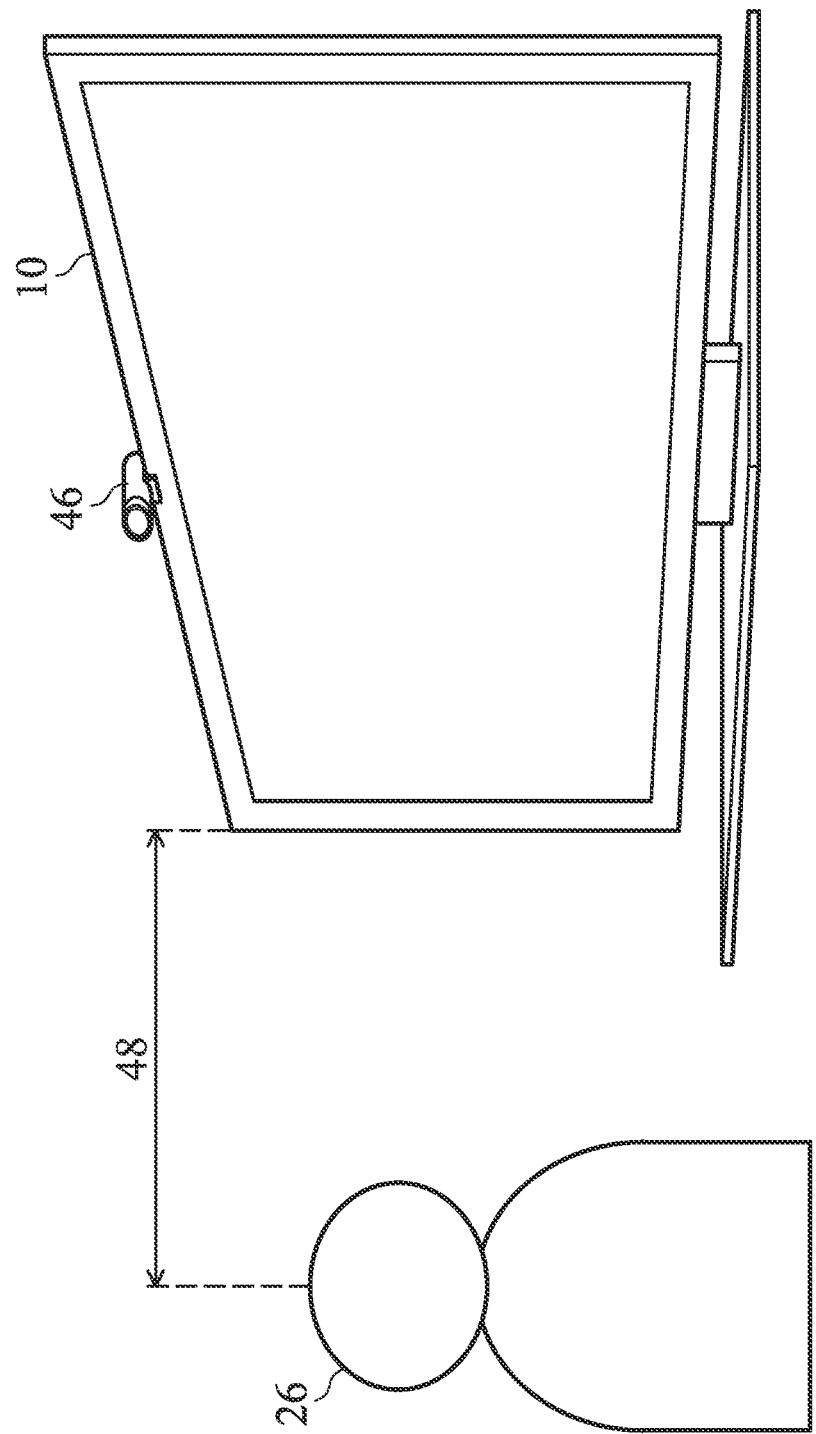
FIG. 6 shows a charge coupled device (CCD) coupled to a display according to an embodiment of the invention.

In one embodiment, the invention further comprises a charge coupled device (CCD) 46 coupled to the display 10 to detect the number of viewers, the distance 48 between the viewer 26 and the display 10 and the angle of the viewer's location, as shown in FIG. 6. The charge coupled device (CCD) 46 is a sensor which can detect optical signals and convert them to electrical signals. Referring to FIGS. 1, 2 and 6 simultaneously, when there is a single viewer, after the charge coupled device 46 detects the location of the viewer 26 and the distance 48 between the viewer 26 and the display 10, the charge coupled device 46 converts the optical signals to electrical signals and transmits the electrical signals to the display 10. After that, the display 10 calculates the received signals to control the light-emitting units 20' of the organic light-emitting diode group 20 to emit light (in this embodiment, two light-emitting units 20' of the organic light-emitting diode group 20 are controlled to emit light, e.g. the two light-emitting units 20' corresponding to P1 and P2) which causes the viewer 26 to receive an accurate left-eye and right-eye pictures and further compose the stereoscopic images.

The display of the invention can control the output of the left-eye and right-eye images based on the angle of the viewer's location detected by the charge coupled device (CCD). When there is a single viewer, the display outputs various left-eye images or right-eye images based on various locations of the viewer. This means, for instance, the left-eye image seen by the viewer standing at the location having an included angle of 10° with the normal of the display is different from the left-eye image seen by the viewer standing at the location having an included angle of −10° with the normal of the display. The display of the invention can also output various right-eye images based on various locations of the viewer. Therefore, a single viewer can see various images when standing at various locations. However, the number of pixels seen by the left eye and right eye of the viewer at this time is equal to the same as that of the first liquid crystal display cell 16; which means the resolution of the stereoscopic images fused by the viewer will not be reduced.

Figure 6A:
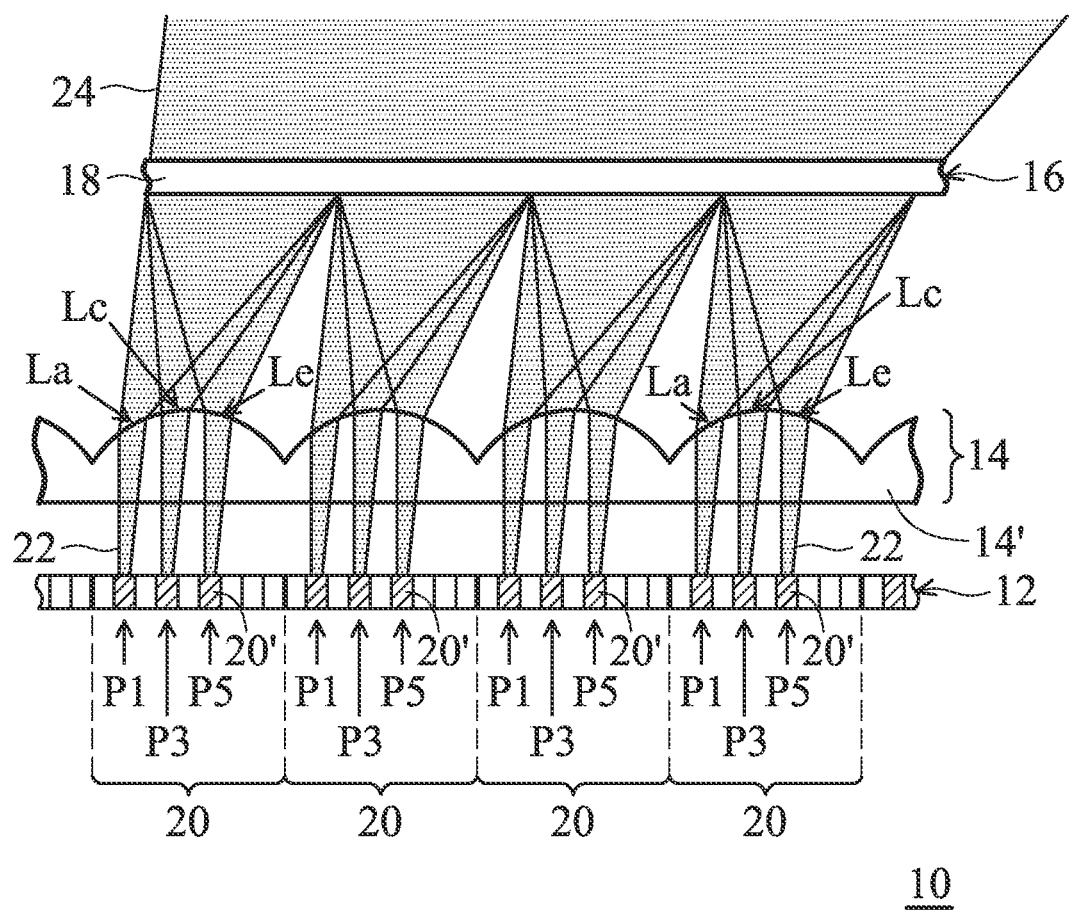
FIG. 6A shows light-emitting positions of light sources of a display when there is more than one viewer according to an embodiment of the invention.
Figure 6B:
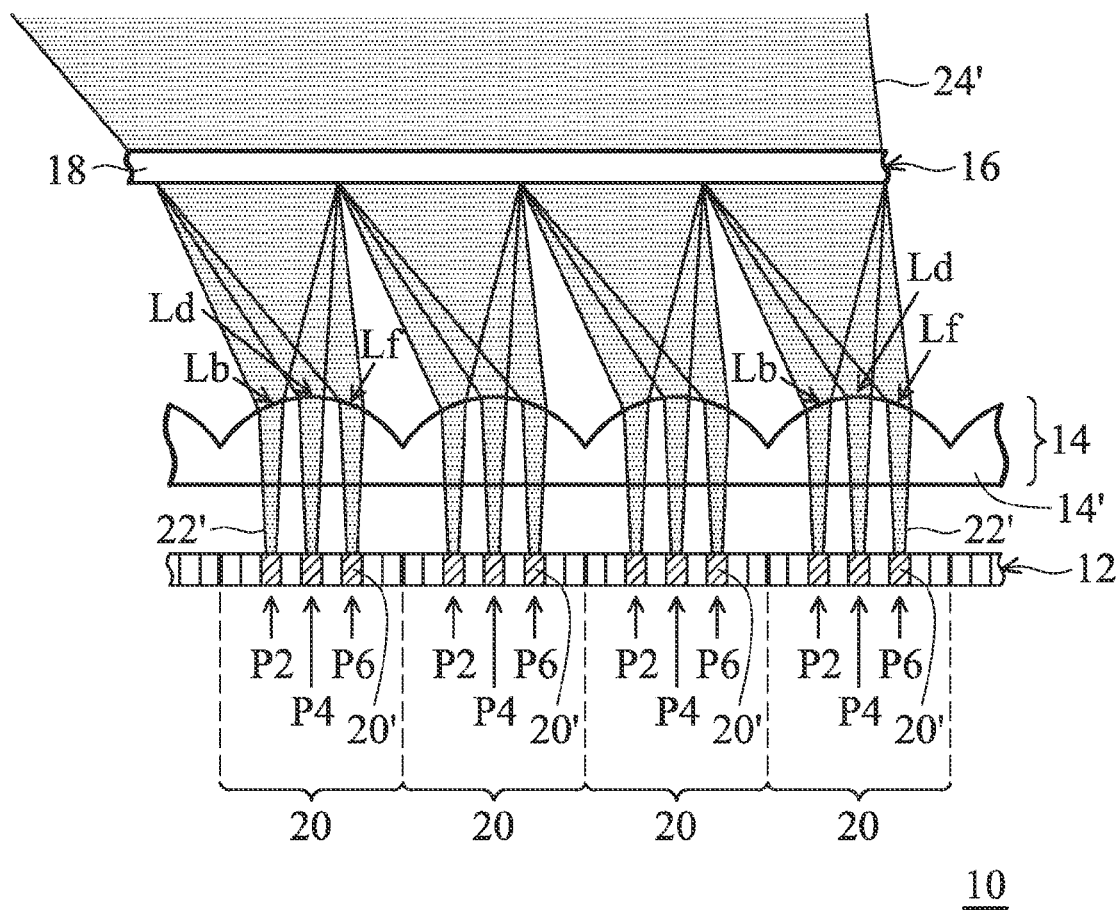
FIG. 6B shows light-emitting positions of light sources of a display when there is more than one viewer according to an embodiment of the invention.
Figure 6C:
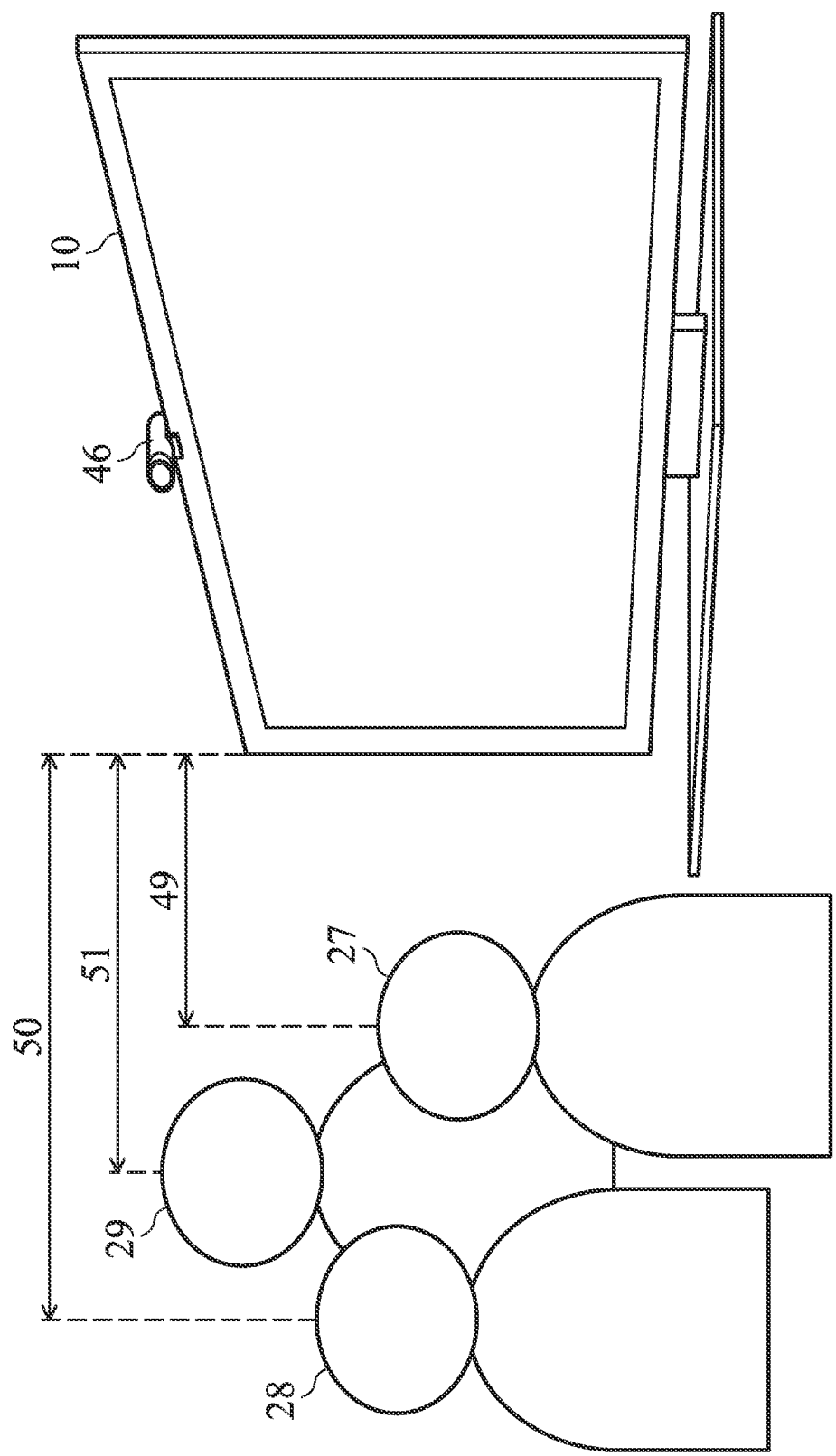
FIG. 6C shows a schematic diagram when more than one viewer is viewing a display according to an embodiment of the invention.

Referring to FIGS. 6A, 6B and 6C simultaneously, the light-emitting system 12 provides the first light source 22 and the second light source 22'. The light-emitting positions of the first light source 22 and the second light source 22' are selected based on the distances (49, 50 and 51) between more than one viewer (27, 28 and 29) and the display 10 and the angles of various viewers' locations detected by the charge coupled device (CCD) 46. For example, when there are three viewers, the organic light-emitting diode units 20' providing the first light source 22 correspond to "position 1" (P1), "position 3" (P3) and "position 5" (P5) in the organic light-emitting diode groups 20, respectively. The first light source 22 provided thereby corresponds to "position a" (La), "position c" (Lc) and "position e" (Le) in the lens array 14, respectively, to adjust the outputted light shape to have individual viewers receive an accurate left-eye image 24. Similarly, the organic light-emitting diode units 20' providing the second light source 22' correspond to "position 2" (P2), "position 4" (P4) and "position 6" (P6) in the organic light-emitting diode groups 20, respectively. The second light source 22' provided thereby corresponds to "position b" (Lb), "position d" (Ld) and "position f" (Lf) in the lens array 14, respectively, to adjust the outputted light shape to have individual viewers receive an accurate right-eye image 24'.

When there is more than one viewer, also, after the charge coupled device (CCD) detects the locations of various viewers and the distances between the viewers and the display, the charge coupled device converts the optical signals to electrical signals and transmits the electrical signals to the display. After that, the display calculates the received signals to control the light-emitting units of the organic light-emitting diode group to emit light (in this embodiment, controlling numerous light-emitting units 20' of the organic light-emitting diode group 20 to emit light, e.g. the light-emitting units 20' corresponding to P1, P3 and P5 and the light-emitting units 20' corresponding to P2, P4 and P6) which causes individual viewers to receive an accurate left-eye and right-eye picture simultaneously and further compose the stereoscopic images. The number of pixels seen by the individual left eye and right eye of the viewer at this time is equal to the same as that of the first liquid crystal display cell 16; which means the resolution of the stereoscopic images fused by individual viewers will not be reduced.

Specifically, different from a single viewer, when there is more than one viewer, the display outputs the same left-eye image information to each viewer; which means regardless of where any one viewer is at, the left-eye image received thereby is the same. Similarly, the display outputs the same right-eye image information to each viewer; which means regardless of where any one viewer is, the right-eye image received thereby is the same. Therefore, when there is more than one viewer, the images seen by each viewer are the same.

Figure 7:
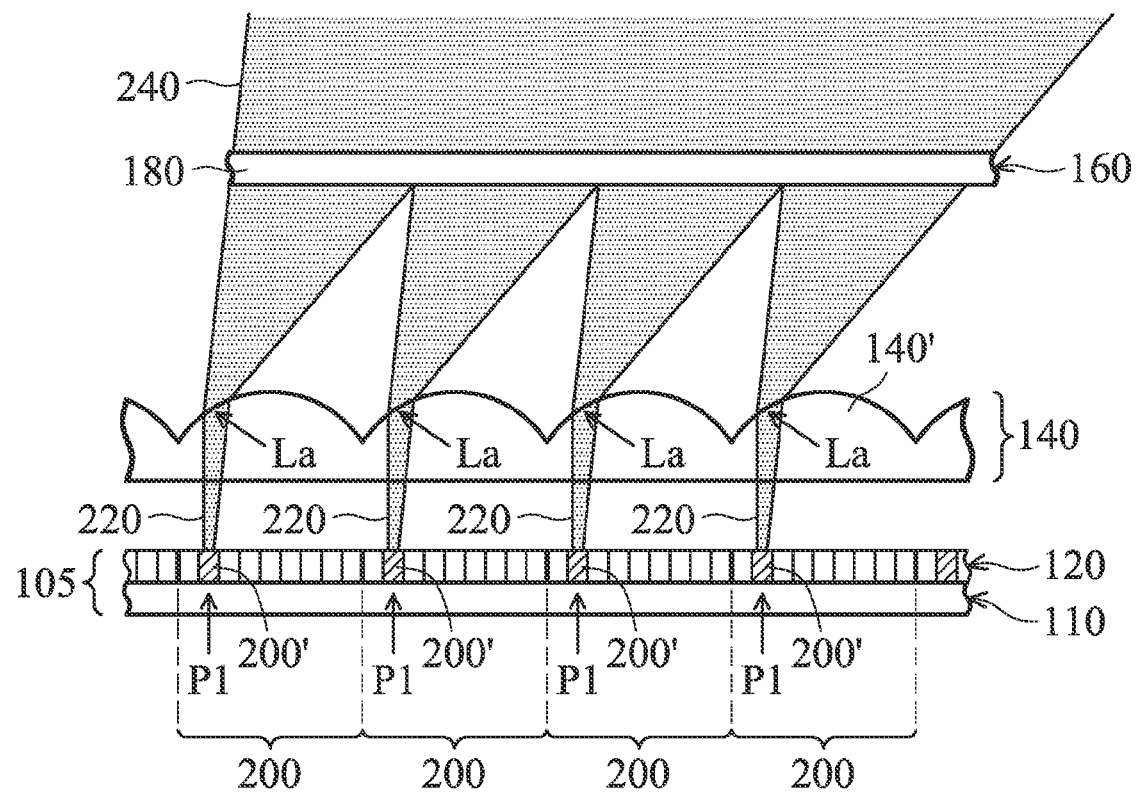
FIG. 7 shows a display according to an embodiment of the invention.
Figure 8:
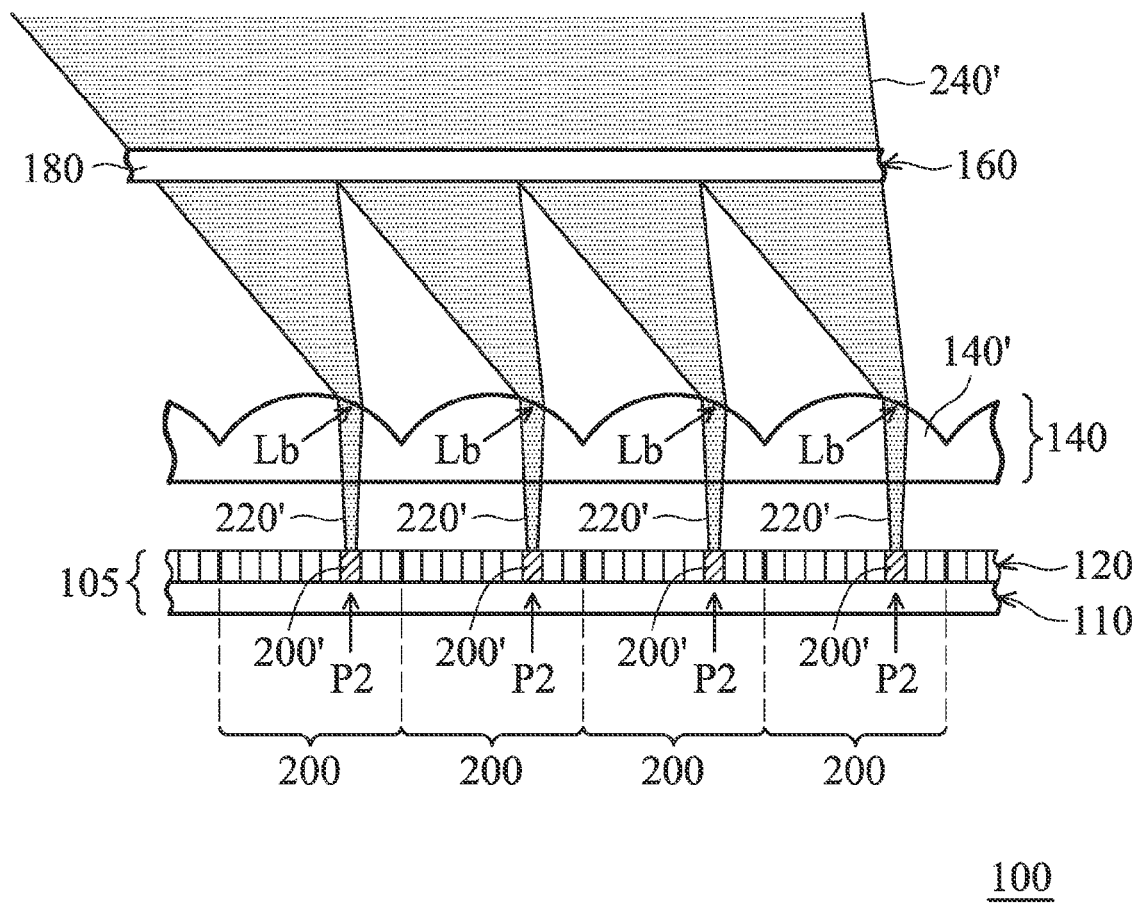
FIG. 8 shows a display according to an embodiment of the invention.

Referring to FIGS. 7-8, in accordance with one embodiment of the invention, a display is illustrated. A display 100 comprises a light-emitting system 105, a lens array 140 and a first liquid crystal display cell 160. The light-emitting system 105 comprises a plurality of light-emitting units (pixels) 200'. Each light-emitting unit (pixel) 200' emits light independently. The lens array 140 comprises a plurality of lenses 140' disposed on the light-emitting system 105. The first liquid crystal display cell 160 comprises a plurality of pixels 180 disposed on the lens array 140.

When the display 100 displays a left-eye picture and a right-eye picture by turns in temporal, a stereoscopic image may be seen by a human. When the display 100 displays pictures without distinguishing a left-eye picture from a right-eye picture in temporal, a non-stereoscopic image may be seen by a human. Therefore, the display 100 may display stereoscopic images. In another embodiment, the display 100 may also be switched to display non-stereoscopic images.

In one embodiment, the light-emitting system 105 may be a second liquid crystal display cell comprising a backlight 110 and a pixel district 120 disposed on the backlight 110. In one embodiment, the backlight 110 may be a scanning backlight, zoning light-emitting by turns. Thus, no comprehensive light-emitting is required for each light-emitting. The backlight 110 emits light to have the second liquid crystal display cell 105 be used as a light-emitting system of the first liquid crystal display cell 160. Specifically, each light-emitting unit (pixel) 200' can control whether having the light emitted from the backlight 110 pass or not. Therefore, each light-emitting unit (pixel) 200' emits light independently.

In one embodiment, the pixel district 120 may comprise a plurality of pixel groups 200. Each pixel group 200 comprises a plurality of pixels 200'. Each pixel 200' corresponds to a position (holding a light-emitting unit) in the pixel group 200. In the pixel district 120, the total number of the pixels 200' is equal to the number of the light-emitting units 200'. When the total number of the pixels 200' of the second liquid crystal display cell 105 is larger than the number of the pixels 180 of the first liquid crystal display cell 160, the second liquid crystal display cell 105 is used as a light-emitting system of the first liquid crystal display cell 160. Preferably, the total number of pixels 200' of the second liquid crystal display cell 105 is at least three times that of the number of pixels 180 of the first liquid crystal display cell 160.

In this embodiment, at a first time, in the light-emitting system 105, at least one pixel 200' of each pixel group 200 provides a first light source 220. The first light source 220 corresponds to a position in the lens array 140. The light shape of the first light source 220 is adjusted by the lens array 140 to have the light shape uniformly distributed, wherein the first light source 220 passes through the first liquid crystal display cell 160 and fills up the display area of the first liquid crystal display cell 160. The first light source 220 passes through a first image 240 provided by the first liquid crystal display cell 160 such that a viewer's left eye receives the first image 240, as shown in FIG. 7. At a second time, in the light-emitting system 105, at least one pixel 200' of each pixel group 200 provides a second light source 220'. The second light source 220' corresponds to another position in the lens array 140. The light shape of the second light source 220' is adjusted by the lens array 140 to have the light shape uniformly distributed, wherein the second light source 220' passes through the first liquid crystal display cell 160 and fills up the display area of the first liquid crystal display cell 160. The second light source 220' passes through a second image 240' provided by the first liquid crystal display cell 160 such that the viewer's right eye receives the second image 240', as shown in FIG. 8. At this time, the first image 240 received by the viewer's left eye and the second image 240' received by the viewer's right eye are fused to form a 3D stereoscopic image in the brain. At this time, the number of the pixels seen by the left eye and right eye of the viewer is equal to the number of the pixels of the first liquid crystal display cell 160. That is, the resolution of the stereoscopic image fused by the viewer will not be reduced. In other embodiments, the output sequence of the left-eye image and right-eye image may be altered. The light-emitting system 105 appoints different pixels 200' to emit light such that the light source (220 or 220') corresponds to various positions in the lens array 140 to change the light shape of the emitted light. The first time may be earlier or later than the second time. The pixels 200' providing the first light source 220 and the pixels 200' providing the second light source 220' correspond to various positions (light-emitting units) in the pixel groups 200. For example, the pixels 200' providing the first light source 220 correspond to "position 1" (P1) in the pixel groups 200 and the first light source 220 provided thereby corresponds to "position a" (La) in the lens array 140, as shown in FIG. 7. Additionally, the pixels 200' providing the second light source 220' correspond to "position 2" (P2) in the pixel groups 200 and the second light source 220' provided thereby corresponds to "position b" (Lb) in the lens array 140, as shown in FIG. 8. "Position 1" (P1) may be adjacent or nonadjacent to "position 2" (P2). No overlapping between "position 1" (P1) and "position 2" (P2) is required. "Position a" (La) may partially or may not overlap with "position b" (Lb). The first liquid crystal display cell 160 does not emit light and the light source is provided by the light-emitting system 105. Therefore, the light-emitting system 105 is equivalent to a backlight system of the first liquid crystal display cell 160. The light source of the light-emitting system 105 is not limited to a white light, and may also be an RGB three-primary-color light source or a non-RGB three-primary-color light source.

Figure 9:
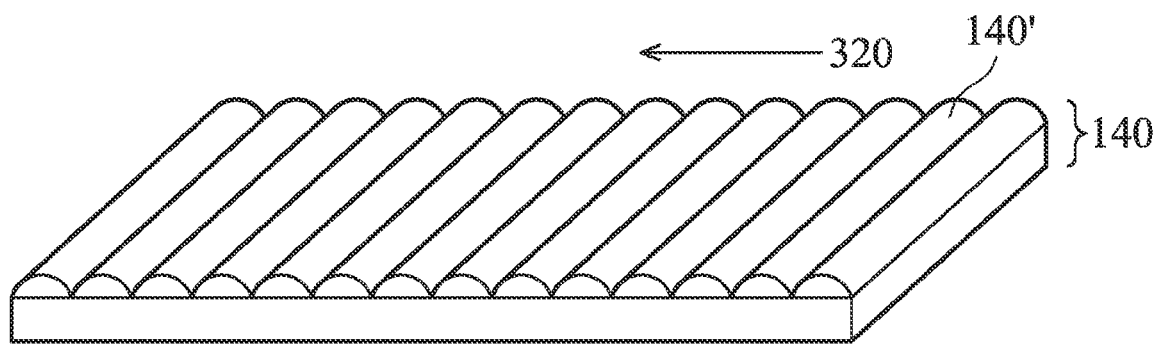
FIG. 9 shows a lens and lens array patterns according to an embodiment of the invention.
Figure 10A:
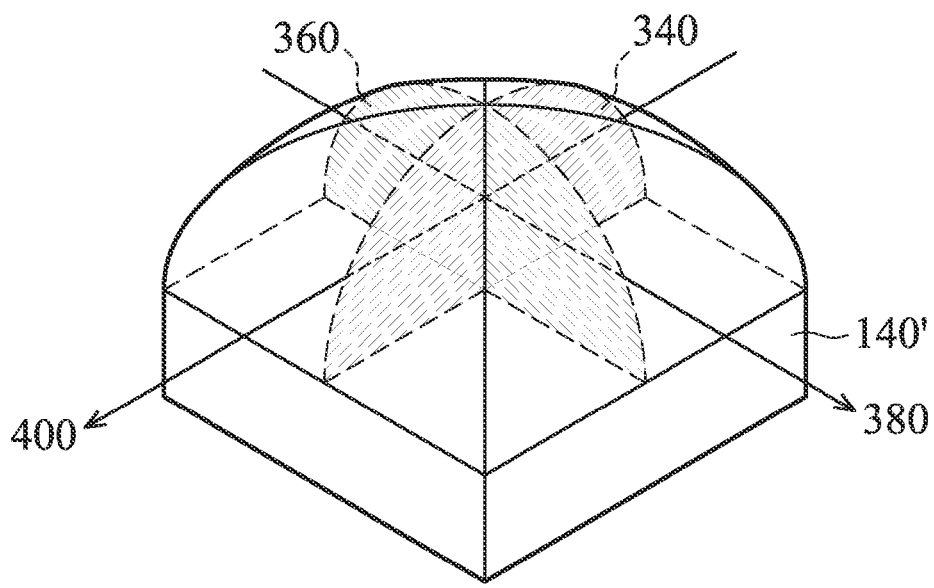
FIG. 10A shows a lens pattern according to an embodiment of the invention.
Figure 10B:
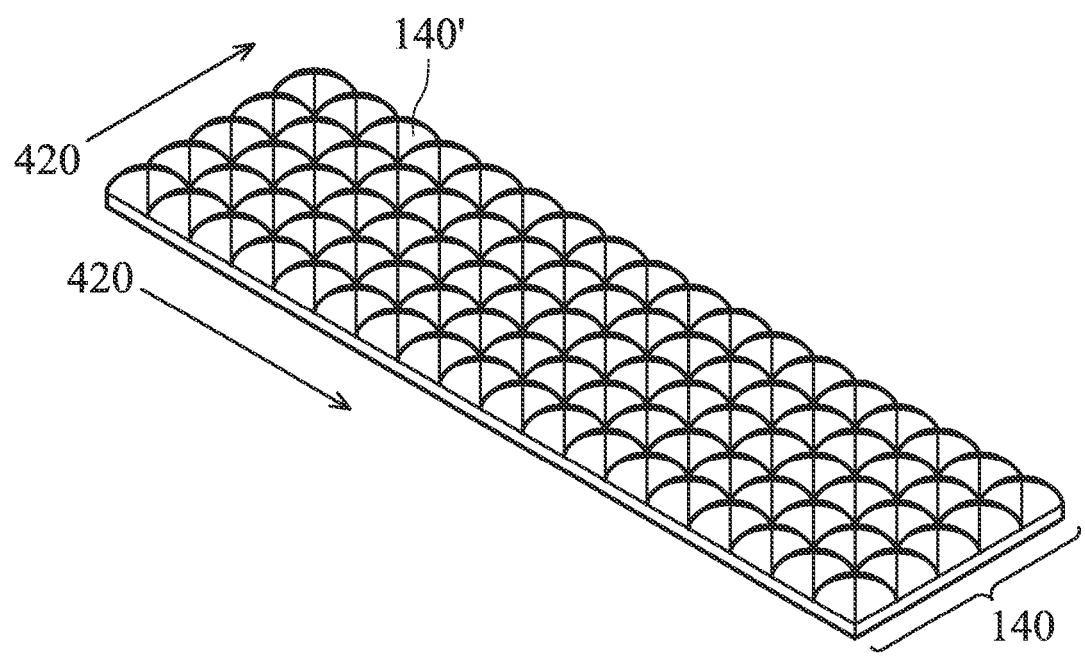
FIG. 10B shows a lens array pattern according to an embodiment of the invention.

In one embodiment, the lens 140' may be columnar and arranged in a strip form 320 to form the lens array 140, as shown in FIG. 9. In another embodiment, referring to FIG. 10A, the lens 140' may also have a first semi-circular cross-section 340 and a second semi-circular cross-section 360. The normal direction 380 of the first semi-circular cross-section 340 is perpendicular to the normal direction 400 of the second semi-circular cross-section 360. In this embodiment, the lens 140' is arranged in an array 420 to form the lens array 140, as shown in FIG. 10B. In other embodiments, the lens 140' may also be arranged in other forms to form the lens array 140 and may have various cross-section shapes (or curvatures). Specifically, the arrangement form of forming the lens array 140 and the cross-section shapes (or curvature) of the lens 140' are adjusted based on the relative position and distance between the light-emitting system 105 and the lens 140' and the same between the light-emitting system 105 and the first liquid crystal display cell 160, to have the light source (220 or 220') emit light towards a given direction and have the light shape uniformly distributed, wherein the light passes through the first liquid crystal display cell 160 and fills up the display area of the first liquid crystal display cell 160, as shown in FIG. 7 or FIG. 8. In addition, the first liquid crystal display cell 160 can control whether light passes or does not pass therethrough, to adjust the gray scale and color.

Additionally, various substances, for example air or glass, may be filled between the lens 140' and the first liquid crystal display cell 160. The spacing between the lens 140' and the first liquid crystal display cell 160 is adjusted based on the various filled substances. In one embodiment, if air (refractive index=1) is filled between the lens 140' and the first liquid crystal display cell 160, the spacing between the lens 140' and the first liquid crystal display cell 160 may be set to, for example, 3 mm. In another embodiment, if glass (refractive index=1.5) is filled between the lens 140' and the first liquid crystal display cell 160, the spacing between the lens 140' and the first liquid crystal display cell 160 should be increased to, for example, 4.5 mm.

Figure 11:
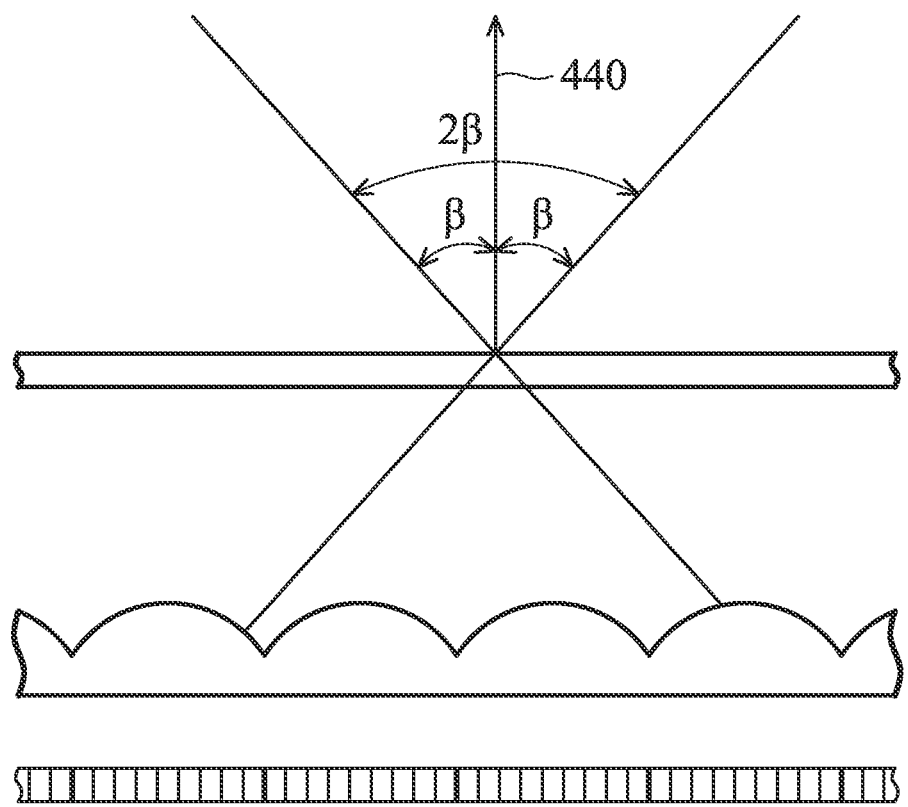
FIG. 11 shows the best viewing area when a viewer is viewing a display according to an embodiment of the invention.

In one embodiment, an included angle $\beta$ between the location of the viewer and the normal 440 of the display 100 is about 0-20° ($0 \leq \beta \leq 20$). This angle range represents the best viewing area ($2\beta$) when the viewer is viewing the display 100, as shown in FIG. 11.

Still referring to FIG. 7 or FIG. 8, in one embodiment, the first liquid crystal display cell 160 may adopt the manner of outputting left-eye and right-eye images by turns and be driven at 120 Hz speeds. In another embodiment, the first liquid crystal display cell 160 may adopt the light-emitting system 105 and display images by adopting the color sequential method. In another embodiment, the first liquid crystal display cell 160 may display images by adopting the color sequential method of three primary colors of red (R), green (G) and blue (B). In another embodiment, the first liquid crystal display cell 160 may adopt colors provided by a light source and further display images by adopting the color sequential method. In another embodiment, the first liquid crystal display cell 160 may also adopt the color sequential method to calculate that at least three time-series pictures are displayed within a frame time creating a more high-speed driving manner.

Additionally, the first liquid crystal display cell 160 may adopt the liquid crystal types with high-speed response time, for example optically compensated bend (OCB) liquid crystal, blue-phase liquid crystal or ferroelectric liquid crystal (FLC), to achieve the requirement for fast liquid crystal response.

In one embodiment, the invention further comprises a charge coupled device (CCD) 460 coupled to the display 100 to detect the number of viewers, the distance 480 between the viewer 260 and the display 100 and the angle of the viewer's location, as shown in FIG. 12. The charge coupled device (CCD) 460 is a sensor which can detect optical signals and convert them to electrical signals. Referring to FIGS. 7, 8 and 12 simultaneously, when there is a single viewer, after the charge coupled device 460 detects the location of the viewer 260 and the distance 480 between the viewer 260 and the display 100, the charge coupled device 460 converts the optical signals to electrical signals and transmits the electrical signals to the display 100. Thereafter, the display 100 calculates the received signals to control the light-emitting units 200' of the pixel group 200 to emit light (in this embodiment, controlling two light-emitting units 200' of the pixel group 200 to emit light, e.g. the two light-emitting units 200' corresponding to P1 and P2) which causes the viewer 260 to receive an accurate left-eye and right-eye pictures and further compose the stereoscopic images.

The display of the invention can control the output of the left-eye and right-eye images based on the angle of the viewer's location detected by the charge coupled device (CCD). When there is a single viewer, the display outputs various left-eye images or right-eye images based on various locations of the viewer. This means, for instance, the left-eye image seen by the viewer standing at the location having an included angle of 10° with the normal of the display is different from the left-eye image seen by the viewer standing at the location having an included angle of –10° with the normal of the display. The display of the invention can also output various right-eye images based on various locations of the viewer. Therefore, a single viewer can see various images when standing at various locations, however, the number of pixels seen by the left eye and right eye of the viewer at this time is equal to the same as that of the first liquid crystal display cell 160, which means the resolution of the stereoscopic images fused by the viewer will not be reduced.

Figure 12A:
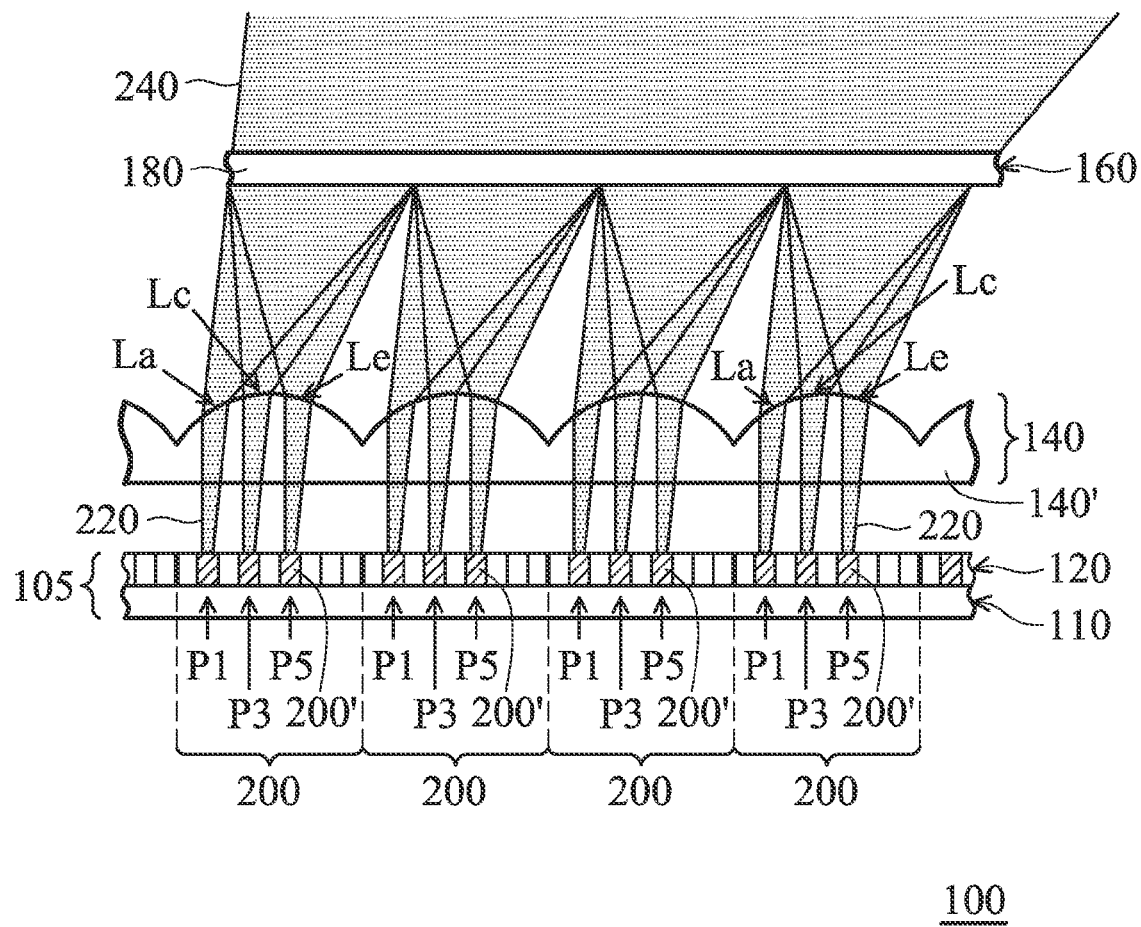
FIG. 12A shows light-emitting positions of light sources of a display when there is more than one viewer according to an embodiment of the invention.
Figure 12B:
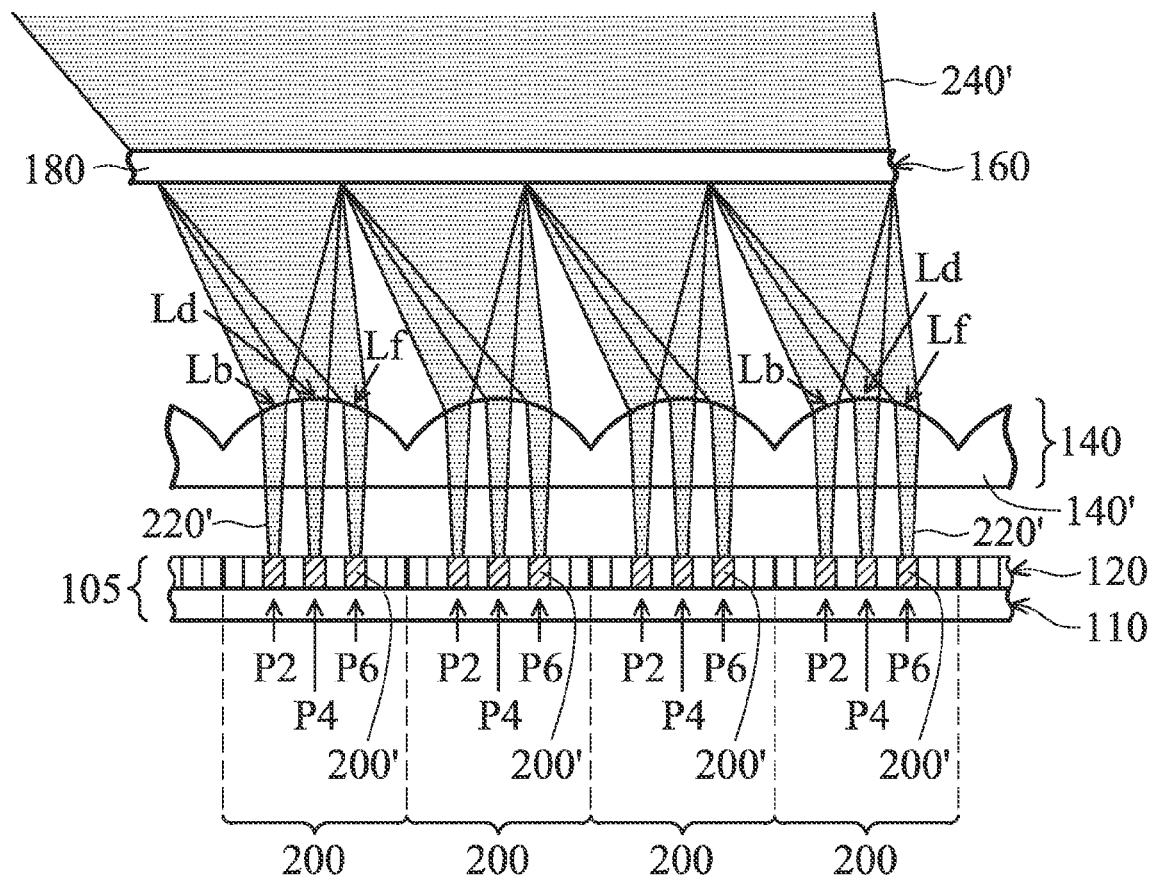
FIG. 12B shows light-emitting positions of light sources of a display when there is more than one viewer according to an embodiment of the invention.
Figure 12C:
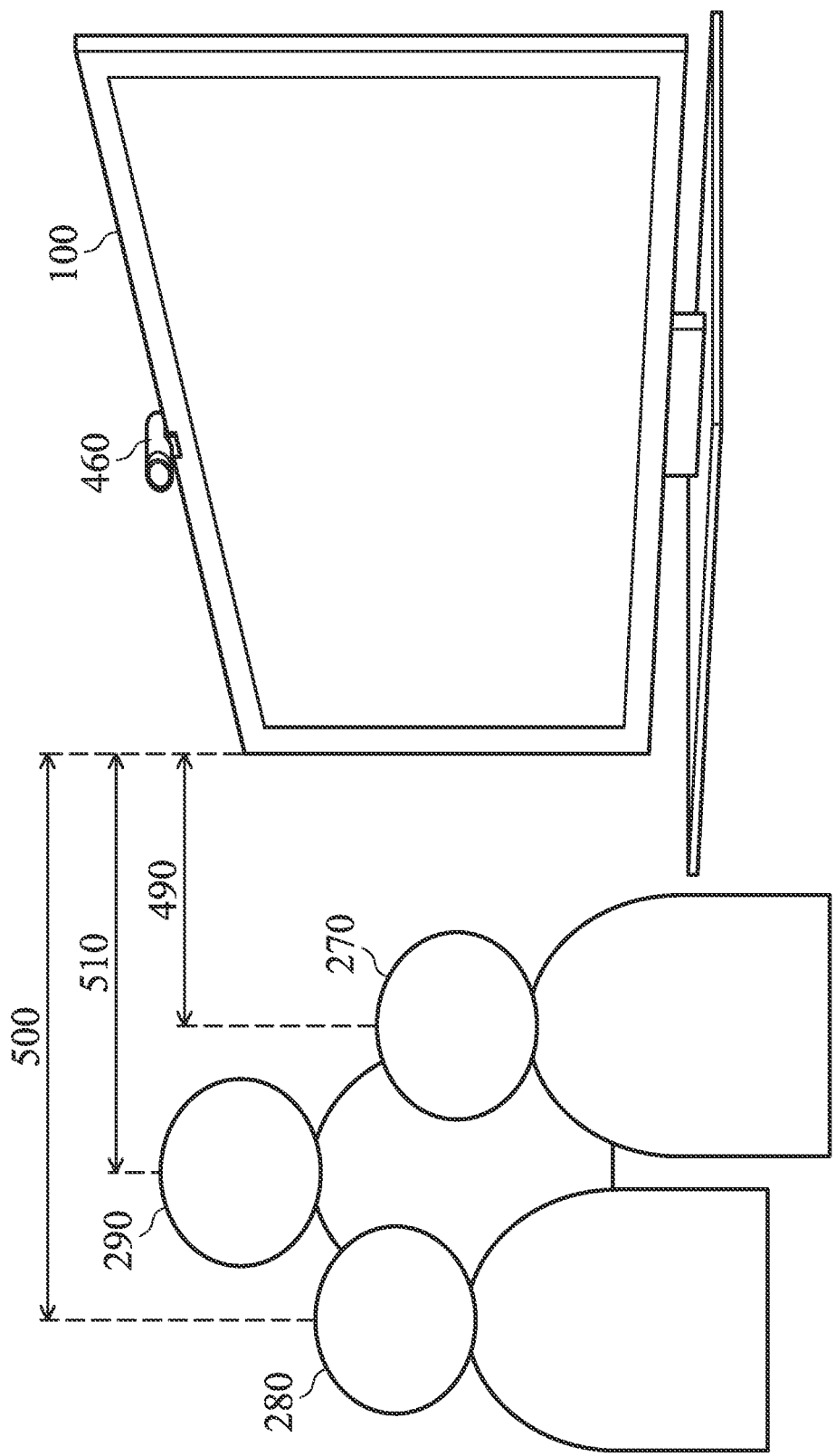
FIG. 12C shows a schematic diagram when more than one viewer is viewing a display according to an embodiment of the invention.

Referring to FIGS. 12A, 12B and 12C simultaneously, the light-emitting system 105 provides the first light source 220 and the second light source 220'. The light-emitting positions of the first light source 220 and the second light source 220' are selected based on the distances (490, 500 and 510) between more than one viewer (270, 280 and 290) and the display 100 and the angles of various viewers' locations detected by the charge coupled device (CCD) 460. For example, when there are three viewers, the pixels 200' providing the first light source 220 correspond to "position 1" (P1), "position 3" (P3) and "position 5" (P5) in the pixel groups 200, respectively. The first light source 220 provided thereby corresponds to "position a" (La), "position c" (Lc) and "position e" (Le) in the lens array 140, respectively, to adjust the outputted light shape to have individual viewers receive an accurate left-eye image 240. Similarly, the pixels 200' providing the second light source 220' correspond to "position 2" (P2), "position 4" (P4) and "position 6" (P6) in the pixel groups 200, respectively. The second light source 220' provided thereby corresponds to "position b" (Lb), "position d" (Ld) and "position f" (Lf) in the lens array 140, respectively, to adjust the outputted light shape to have individual viewers receive an accurate right-eye image 240'.

When there is more than one viewer, also, after the charge coupled device (CCD) detects the locations of various viewers and the distances between the viewers and the display, the charge coupled device converts the optical signals to electrical signals and transmits the electrical signals to the display. Thereafter, the display calculates the received signals to control the light-emitting units of the pixel group to emit light (in this embodiment, controlling numerous light-emitting units 200' of the pixel group 200 to emit light, e.g. the light-emitting units 200' corresponding to P1, P3 and P5 and the light-emitting units 200' corresponding to P2, P4 and P6) which causes individual viewers to receive accurate left-eye and right-eye pictures simultaneously and further compose the stereoscopic images. The number of pixels seen by the individual left eye and right eye of the viewer at this time is equal to the same as that of the first liquid crystal display cell 160 which means the resolution of the stereoscopic images fused by individual viewers will not be reduced.

Specifically, different from a single viewer, when there is more than one viewer, the display outputs the same left-eye image information to each viewer; which means regardless of where any one viewer is, the left-eye image received thereby is the same. Similarly, the display outputs the same right-eye image information to each viewer; which means regardless of where any one viewer is, the right-eye image received thereby is the same. Therefore, when there is more than one viewer, the images seen by each viewer are the same.

In one embodiment, the number of the pixels of the pixel district 120 of the second liquid crystal display cell 105 is at least three times that of the pixels of the first liquid crystal display cell 160.

Figure 13A:
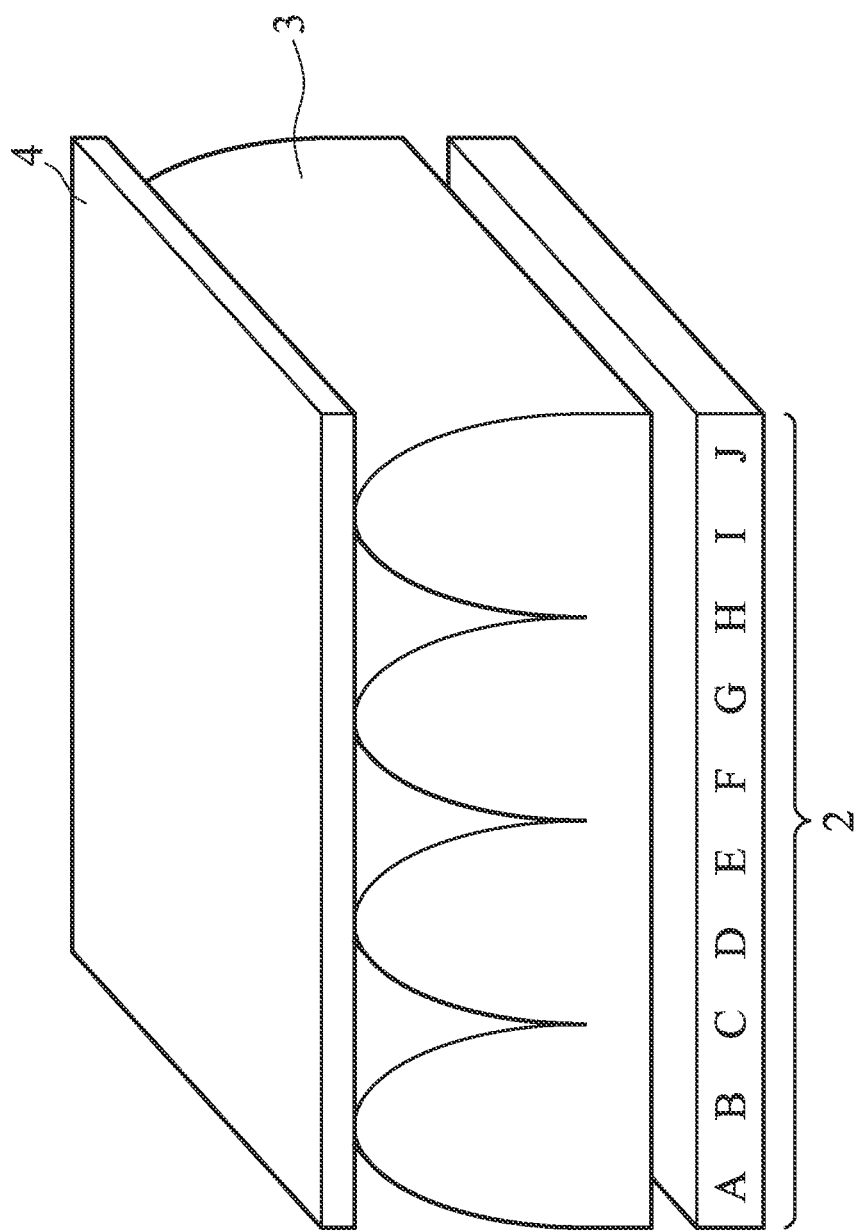
FIG. 13A shows a part of a structure of a display according to an embodiment of the invention.
Figure 13B:
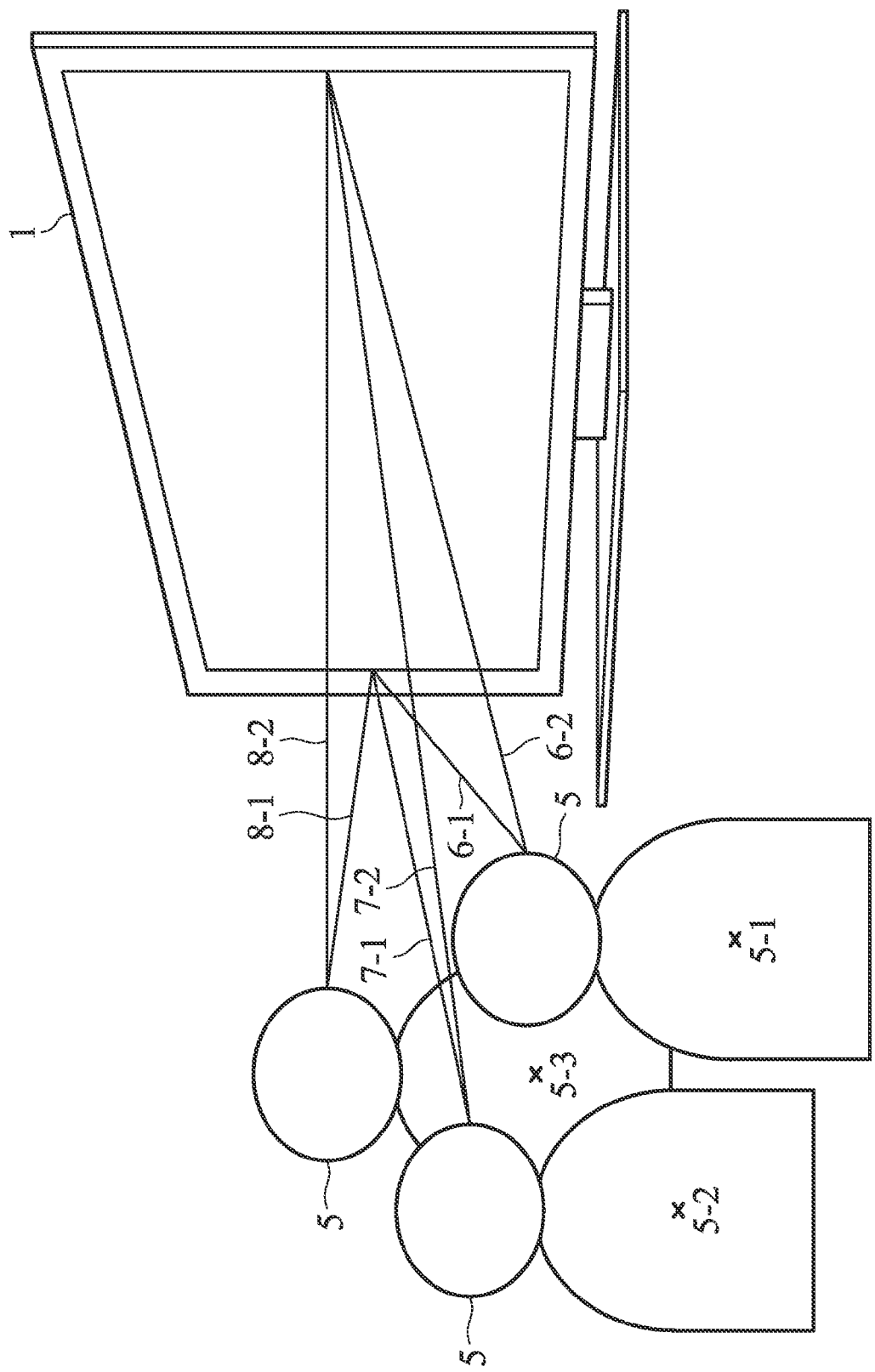
FIG. 13B shows a multi-view display according to an embodiment of the invention.

To illustrate the display of the invention, for example a display 1 (as shown in FIG. 13B), can be a multi-view display, and in this example, a part of a structure of the display 1 of the invention is selected. Referring to FIG. 13A, the part of the structure of the display 1 comprises an organic light-emitting diode group 2 comprising a plurality of organic light-emitting diode units (A, B, C, D, E, F, G, H, I, J), a lens array 3 disposed on the organic light-emitting diode group 2 and a liquid crystal display cell 4 disposed on the lens array 3. FIG. 13A is merely schematic. The relative position between the lens array 3 and the organic light-emitting diode units (A, B, C, D, E, F, G, H, I, J) may also be altered based on various requirements. Referring to FIG. 13B, simultaneously, when there is a single viewer, a viewer 5 is located at a first location 5-1. At a first time, for example, the organic light-emitting diode unit A of the organic light-emitting diode group 2 provides a first light source passing through a first image 6-1 provided by the liquid crystal display cell 4 such that the left eye of the viewer 5 receives the first image 6-1. At a second time, for example, the organic light-emitting diode unit C of the organic light-emitting diode group 2 provides a second light source passing through a second image 6-2 provided by the liquid crystal display cell 4 such that the right eye of the viewer 5 receives the second image 6-2. At this time, the first image 6-1 received by the left eye of the viewer 5 and the second image 6-2 received by the right eye of the viewer 5 are fused to form a 3D stereoscopic image in the brain. Next, the viewer 5 moves to a second location 5-2. At a first time, for example, the organic light-emitting diode unit D of the organic light-emitting diode group 2 provides a first light source passing through a first image 7-1 provided by the liquid crystal display cell 4 such that the left eye of the viewer 5 receives the first image 7-1. At a second time, for example, the organic light-emitting diode unit F of the organic light-emitting diode group 2 provides a second light source passing through a second image 7-2 provided by the liquid crystal display cell 4 such that the right eye of the viewer 5 receives the second image 7-2. At this time, the first image 7-1 received by the left eye of the viewer 5 and the second image 7-2 received by the right eye of the viewer 5 are fused to form a 3D stereoscopic image in the brain. Next, the viewer 5 moves to a third location 5-3. At a first time, for example, the organic light-emitting diode unit G of the organic light-emitting diode group 2 provides a first light source passing through a first image 8-1 provided by the liquid crystal display cell 4 such that the left eye of the viewer 5 receives the first image 8-1. At a second time, for example, the organic light-emitting diode unit I of the organic light-emitting diode group 2 provides a second light source passing through a second image 8-2 provided by the liquid crystal display cell 4 such that the right eye of the viewer 5 receives the second image 8-2. At this time, the first image 8-1 received by the left eye of the viewer 5 and the second image 8-2 received by the right eye of the viewer 5 are fused to form a 3D stereoscopic image in the brain. In the invention, various organic light-emitting diode units (e.g., A-C, D-F, G-I) are provided as light sources based on the locations (e.g., 5-1, 5-2 and 5-3) of the viewer 5 to have the viewer 5 at various locations (e.g., 5-1, 5-2 and 5-3) be able to view 3D stereoscopic images. Specifically, at this time, the viewer 5 at various locations (e.g., 5-1, 5-2 and 5-3) views various 3D stereoscopic images. By the above illustration, the display of the invention can be a multi-view stereoscopic display.

Figure 14A:
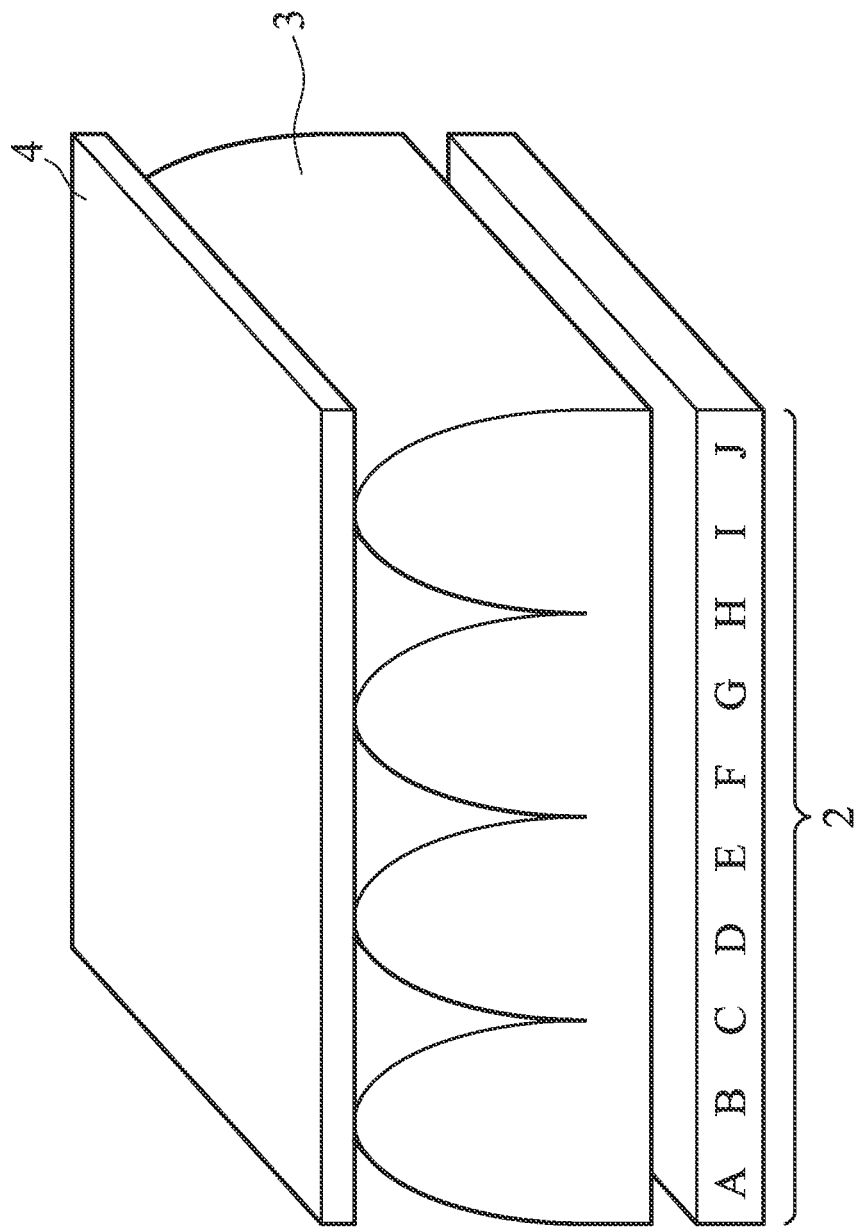
FIG. 14A shows a part of a structure of a display according to an embodiment of the invention.
Figure 14B:
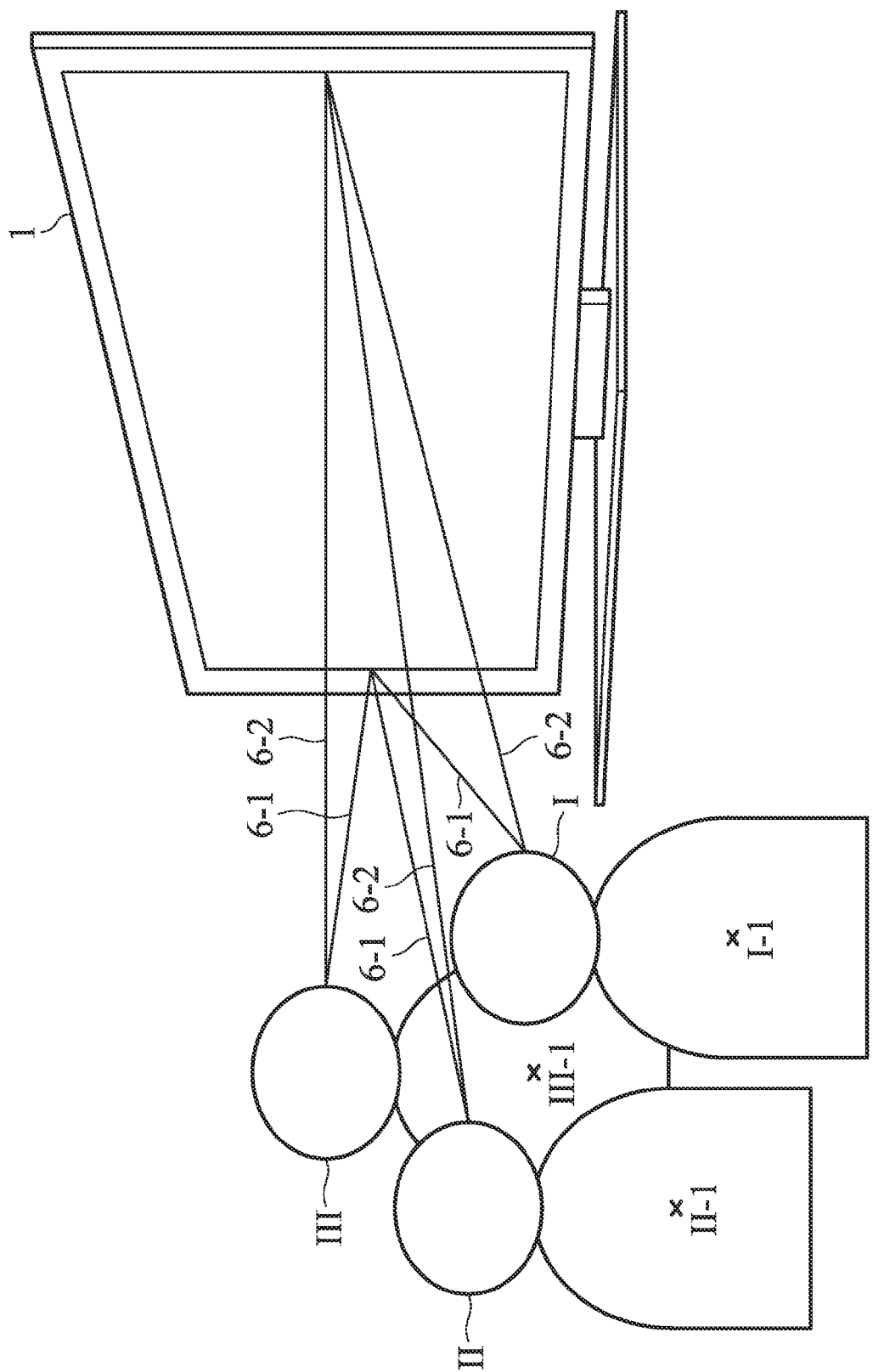
FIG. 14B shows a multi-user display according to an embodiment of the invention.

To illustrate the display of the invention, for example a display 1 (as shown in FIG. 14B), can be a multi-user display, and in this example, a part of a structure of the display 1 of the invention is selected. Referring to FIG. 14A, the part of the structure of the display 1 comprises an organic light-emitting diode group 2 comprising a plurality of organic light-emitting diode units (A, B, C, D, E, F, G, H, I, J), a lens array 3 disposed on the organic light-emitting diode group 2 and a liquid crystal display cell 4 disposed on the lens array 3. FIG. 14A is merely schematic. The relative position between the lens array 3 and the organic light-emitting diode units (A, B, C, D, E, F, G, H, I, J) may also be altered based on various requirements. Referring to FIG. 14B, simultaneously, when there is more than one viewer, for example three viewers, a viewer I is located at a first location I-1, a viewer II is located at a second location II-1 and a viewer III is located at a third location III-1. At a first time, for example, the organic light-emitting diode units (A, D, G) of the organic light-emitting diode group 2 simultaneously provide a first light source passing through a first image 6-1 provided by the liquid crystal display cell 4 such that the left eyes of the viewers (I, II, III) receive the first image 6-1, respectively. At a second time, for example, the organic light-emitting diode units (C, F, I) of the organic light-emitting diode group 2 simultaneously provide a second light source passing through a second image 6-2 provided by the liquid crystal display cell 4 such that the right eyes of the viewers (I, II, III) receive the second image 6-2, respectively. At this time, the first image 6-1 received by the left eyes of the viewers (I, II, III) and the second image 6-2 received by the right eyes of the viewers (I, II, III) are fused to form a 3D stereoscopic image in the brain, respectively. In the invention, various organic light-emitting diode units (e.g., A-D-G, C-F-I) are provided as light sources based on the locations (e.g., I-1, II-1 and III-1) and number of the viewers (e.g., I, II, III) to have various viewers (e.g., I, II, III) at various locations (e.g., I-1, II-1 and III-1) be able to view 3D stereoscopic images. Specifically, at this time, various viewers (e.g., I, II, III) at various locations (e.g., I-1, II-1 and III-1) view the same 3D stereoscopic images. By the above illustration, the display of the invention can be a multi-user stereoscopic display.

In one embodiment, the lens 140' may be columnar and arranged in a strip form 320 to form the lens array 140, as shown in FIG. 9. In another embodiment, referring to FIG. 10A, the lens 140' may also have a first semi-circular cross-section 340 and a second semi-circular cross-section 360. The normal direction 380 of the first semi-circular cross-section 340 is perpendicular to the normal direction 400 of the second semi-circular cross-section 360. In this embodiment, the lens 140' is arranged in an array 420 to form the lens array 140, as shown in FIG. 10B. In other embodiments, the lens 140' may also be arranged in other forms to form the lens array 140 and may have various cross-section shapes (or curvatures). Specifically, the arrangement form of forming the lens array 140 and the cross-section shapes (or curvature) of the lens 140' are adjusted based on the relative position and distance between the light-emitting system 105 and the lens 140' and the same between the light-emitting system 105 and the first liquid crystal display cell 160 to have the light source (220 or 220') emit light towards a given direction and have the light shape uniformly distributed, wherein the light passes through the first liquid crystal display cell 160 and fills up the display area of the first liquid crystal display cell 160, as shown in FIG. 7 or FIG. 8.

Figure 15A:
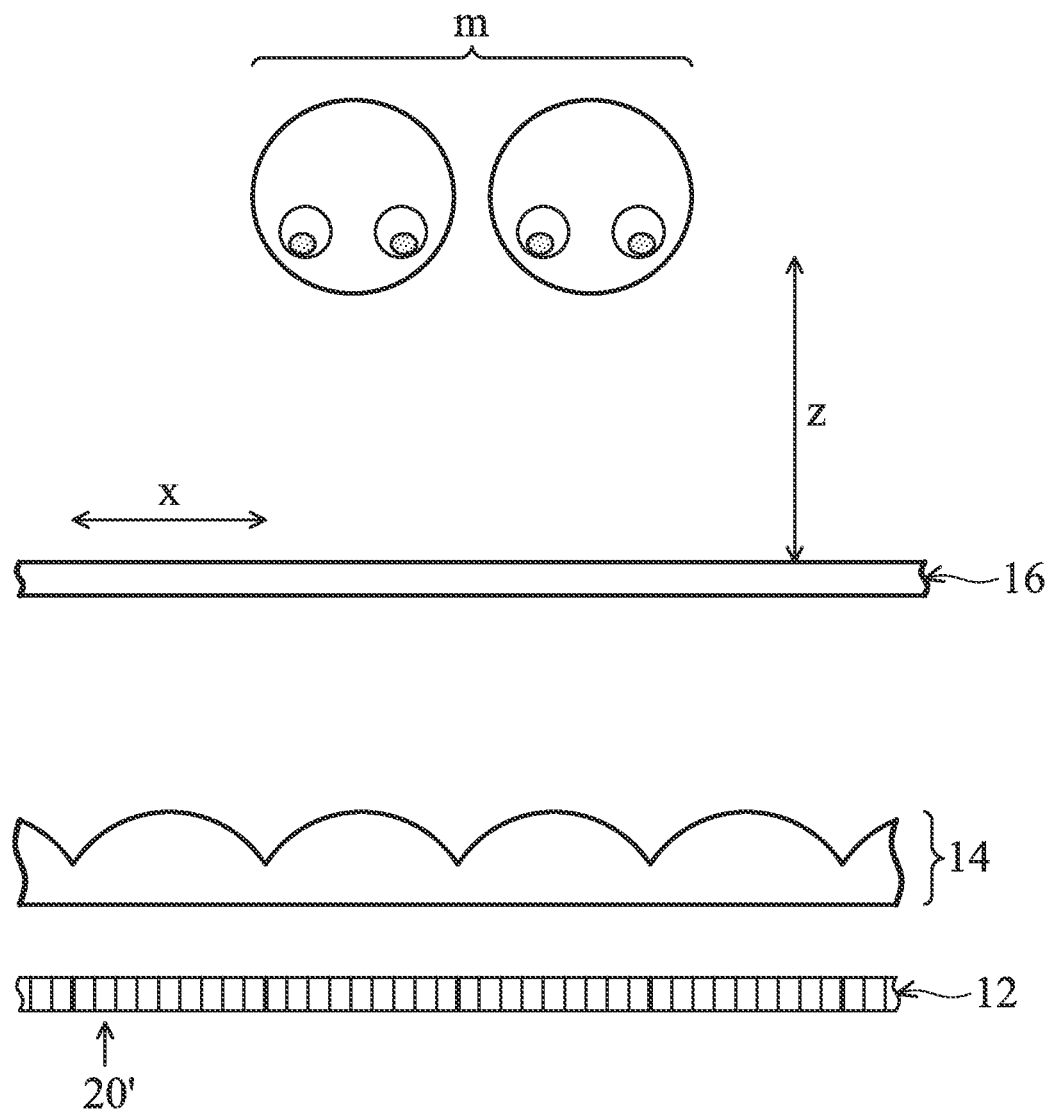
FIG. 15A shows a pixel size, the largest number of viewers and a better viewing distance according to an embodiment of the invention.
Figure 15B:
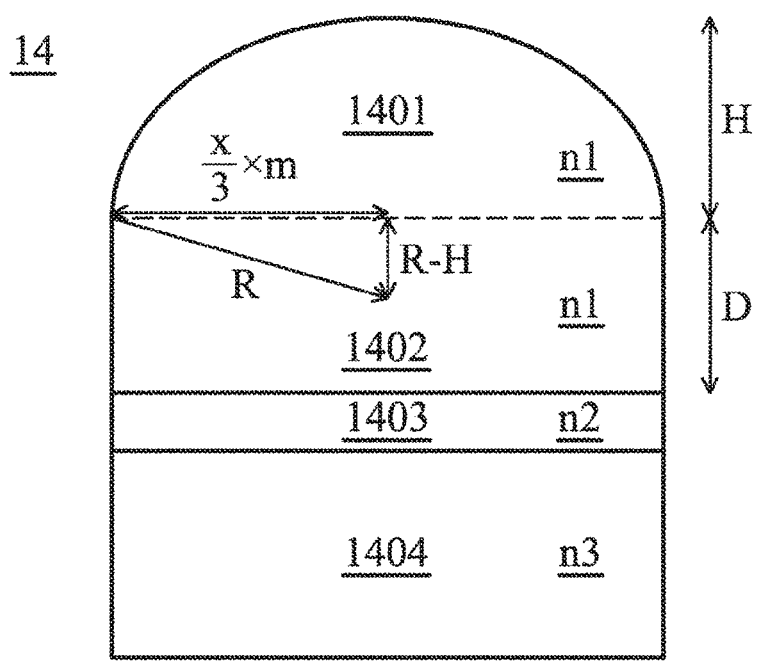
FIG. 15B shows a cross-sectional design of a lens array according to an embodiment of the invention.

Referring to FIGS. 15A and 15B, a concrete embodiment of a cross-sectional design of the lens array 14 is shown. The concrete embodiment takes the light-emitting system 12 of organic light-emitting diodes as an example. In other embodiments, the light-emitting system 12 can also be replaced by the second liquid crystal display cell 105 and the number of the light-emitting units of the second liquid crystal display cell being three times that of the pixels of the first liquid crystal display cell is only an example. In other embodiments, various cross-section shapes of the lenses can be designed based on the number of the light-emitting units of the second liquid crystal display cell being a various number of times that of the pixels of the first liquid crystal display cell. In the concrete embodiment, the related parameters of the cross-section shape of the lens can demonstrate the following relationship:

$$R^2 = (R - H)^2 + \left(\frac{\frac{x}{3} \times m}{2}\right)^2$$

$$D = \frac{n1}{n1 - 1} \times R$$

In the above formulae, m is the number of viewers, x is pixel size, H is the height of the upper portion 1401 of the lens, R is the radius of the arc of the upper portion 1401 of the lens, D is the height of the lower portion 1402 of the lens, and n1 is the refractive index of the lens material.

In one embodiment, the lens 14 is a multi-layer structure, further comprising an adhesive layer 1403 and a basal layer 1404. The refractive index of the adhesive layer 1403 is n2. The refractive index of the basal layer 1404 is n3. The relationships among such refractive indexes may be n1>n2 and n1>n3.

The design of the lens of the invention adopting parameters including the pixel size x and the largest number of viewers m, etc. and defining the height H of the upper portion 1401 of the lens can design the cross-section shapes and arrangement forms of the lens and the better viewing distance z and angle can be calculated via said parameters. Among the parameters, a preferable range of the pixel size x is from 1 μm to 1,000 μm and the number of viewers m is from one viewer to ten viewers. It is understandable that the pixel size x and the number of viewers m are changed correspondingly with the change in the size of the display. When the display is a large-scale outdoor billboard display, the pixel size x may be from 1 μm to 1 cm.

The invention adopts organic light-emitting diodes (OLEDs) or a liquid crystal display (LCD) cell with a backlight as a sectional light-emitting system of a display and a tracking technology (e.g. coupling a charge coupled device (CCD)) to control which light-emitting unit in the light-emitting system should be turned on or turned off to provide various stereoscopic images (multi-views) to a viewer at various locations and efficiently lower "cross talk" phenomenon. Furthermore, the light-emitting system of the display of the invention can also turn on numerous light-emitting units simultaneously to provide the same stereoscopic image to more than one viewer (multi-users) to view at the same time while other unnecessary light-emitting units can be directly turned off to achieve the effect of energy saving. The number of pixels seen by the left eye and right eye of the viewer is equal to the same as that of the first liquid crystal display cell (16, 160) which means the resolution of the stereoscopic images fused by the viewer will not be reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display, comprising:
   a light-emitting system comprising a plurality of light-emitting units, wherein each light-emitting unit emits light independently;
   a lens array comprising a plurality of lenses disposed on the light-emitting system, wherein the lens comprises an upper portion having an arc and a lower portion; and
   a first liquid crystal display cell comprising a plurality of pixels disposed on the lens array, wherein the number of the light-emitting units of the light-emitting system is larger than the number of the pixels of the first liquid crystal display cell, wherein parameters of the cross-section shape of the lens demonstrate the following relationship:

$$R^2 = (R - H)^2 + \left(\frac{\frac{x}{3} \times m}{2}\right)^2, D = \frac{n1}{n1 - 1} \times R,$$

wherein m is the number of viewers, x is pixel size, H is the height of the upper portion of the lens, R is the radius of the arc of the upper portion of the lens, D is the height of the lower portion of the lens, and n1 is the refractive index of the lens.

2. The display as claimed in claim 1, wherein the light-emitting system comprises a plurality of organic light-emitting diode groups, each organic light-emitting diode group comprises a plurality of organic light-emitting diode units, and each organic light-emitting diode unit corresponds to a position in the organic light-emitting diode group.

3. The display as claimed in claim 2, wherein the position in the organic light-emitting diode group corresponding to each organic light-emitting diode unit holds a light-emitting unit.

4. The display as claimed in claim 2, wherein the organic light-emitting diode units are passive matrix or active-matrix organic light-emitting diodes.

5. The display as claimed in claim 2, wherein at least one organic light-emitting diode unit of each organic light-emitting diode group provides a first light source passing through a first image at a first time such that one eye of a viewer receives the first image, and at least one organic light-emitting diode unit of each organic light-emitting diode group provides a second light source passing through a second image at a second time such that the other eye of the viewer receives the second image, wherein the first time is earlier than the second time, and the organic light-emitting diode units providing the first light source and the organic light-emitting diode units providing the second light source correspond to various positions in the organic light-emitting diode groups.

6. The display as claimed in claim 1, wherein the light-emitting system is a second liquid crystal display cell.

7. The display as claimed in claim 6, wherein the second liquid crystal display cell comprises a backlight and a pixel district disposed on the backlight.

8. The display as claimed in claim 7, wherein the backlight is a scanning backlight.

9. The display as claimed in claim 7, wherein the pixel district comprises a plurality of pixel groups, each pixel group comprises a plurality of pixels, and each pixel corresponds to a position in the pixel group.

10. The display as claimed in claim 9, wherein the position in the pixel group corresponding to each pixel holds a light-emitting unit.

11. The display as claimed in claim 9, wherein at least one pixel of each pixel group provides a first light source passing through a first image at a first time such that one eye of a viewer receives the first image, and at least one pixel of each pixel group provides a second light source passing through a second image at a second time such that the other eye of the viewer receives the second image, wherein the first time is earlier than the second time, and the pixels providing the first light source and the pixels providing the second light source correspond to various positions in the pixel groups.

12. The display as claimed in claim 1, wherein the lenses are arranged in a strip form.

13. The display as claimed in claim 1, wherein the lenses are arranged in an array.

14. The display as claimed in claim 13, wherein the lens has a first semi-circular cross-section having a normal direction and a second semi-circular cross-section having a normal direction, and the normal direction of the first semi-circular cross-section is perpendicular to the normal direction of the second semi-circular cross-section.

15. The display as claimed in claim 9, wherein the number of the pixels of the pixel district of the second liquid crystal display cell is at least three times that of the pixels of the first liquid crystal display cell.

16. The display as claimed in claim 1, wherein the number of the light-emitting units of the light-emitting system is at least three times that of the pixels of the first liquid crystal display cell.

17. The display as claimed in claim 1, wherein the first liquid crystal display cell is a blue-phase or ferroelectric liquid crystal display cell.

18. The display as claimed in claim 1, further comprising a charge coupled device (CCD) coupled to the display to detect the number of viewers and distance between the viewers and the display.

19. The display as claimed in claim 1, wherein when there is more than one viewer, the display provides the same image to the viewers.

20. The display as claimed in claim 1, wherein when there is a single viewer, the display provides various images to the viewer based on various locations of the viewer.

* * * * *

UNITED STATES PATENT AND TRADEMARK OFFICE
CERTIFICATE OF CORRECTION

PATENT NO. : 9,170,454 B2  Page 1 of 1
APPLICATION NO. : 13/686545
DATED : October 27, 2015
INVENTOR(S) : Huang et al.

It is certified that error appears in the above-identified patent and that said Letters Patent is hereby corrected as shown below:

On the title page of the issued patent, the assignee "INNOLUZ" should be changed to "INNOLUX."

Signed and Sealed this
Twenty-second Day of March, 2016

Michelle K. Lee
*Director of the United States Patent and Trademark Office*